(12) United States Patent
Kobashi

(10) Patent No.: US 12,154,525 B2
(45) Date of Patent: Nov. 26, 2024

(54) DISPLAY DEVICE

(71) Applicant: Japan Display Inc., Tokyo (JP)

(72) Inventor: Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/507,211

(22) Filed: Nov. 13, 2023

(65) Prior Publication Data

US 2024/0169949 A1    May 23, 2024

(30) Foreign Application Priority Data

Nov. 17, 2022    (JP) ................... 2022-184093

(51) Int. Cl.
*G09G 3/36*    (2006.01)
*G02F 1/1334*    (2006.01)
*G09G 3/20*    (2006.01)

(52) U.S. Cl.
CPC ......... *G09G 3/3648* (2013.01); *G02F 1/1334* (2013.01); *G09G 3/2007* (2013.01); *G09G 2320/0233* (2013.01); *G09G 2320/0271* (2013.01); *G09G 2360/145* (2013.01)

(58) Field of Classification Search
CPC ............ G09G 3/3648; G09G 3/2007; G09G 2320/0233; G09G 2320/0271; G09G 2360/145; G09G 3/36; G02F 1/1334; G02F 1/133302; G02F 1/133616; G02F 2201/50; G02F 2203/30; G02F 1/13345; G02F 1/1362; G02F 2202/28; G02B 6/00
See application file for complete search history.

(56) References Cited

U.S. PATENT DOCUMENTS

| | | | |
|---|---|---|---|
| 2017/0160592 A1* | 6/2017 | Okuyama | ......... G02F 1/134309 |
| 2021/0012726 A1* | 1/2021 | Ozaki | ...................... G09G 3/36 |
| 2022/0004052 A1 | 1/2022 | Ohue | |

FOREIGN PATENT DOCUMENTS

JP    2020-160254 A    10/2020

\* cited by examiner

*Primary Examiner* — Jonathan A Boyd
(74) *Attorney, Agent, or Firm* — Michael Best & Friedrich LLP

(57) ABSTRACT

A display device includes: a display panel including a display region overlapping pixels; a light source device disposed on a lateral side of the display panel; and a drive circuit configured to calculate an output gradation value based on an input gradation value and to output a pixel drive signal corresponding to the output gradation value to a corresponding one of the pixels. The pixels include a first pixel and a second pixel arranged in a first direction from a first side surface toward a second side surface. The second pixel is between the first pixel and the second side surface. When the input gradation value for the first pixel is equal to the input gradation value for the second pixel, the drive circuit is configured to set the output gradation value for the second pixel to be larger than the output gradation value for the first pixel.

14 Claims, 26 Drawing Sheets

FIG.5
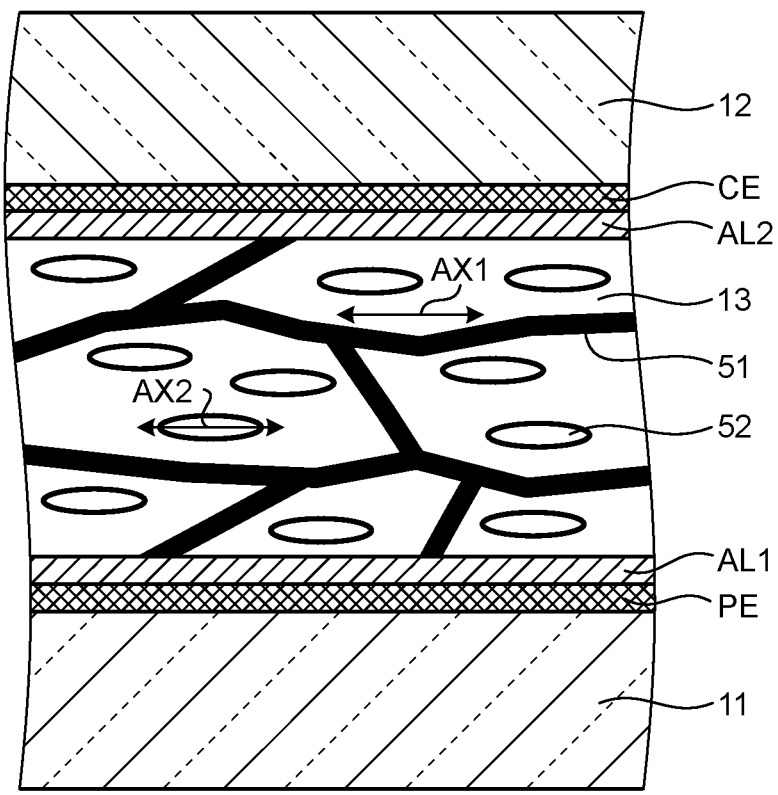
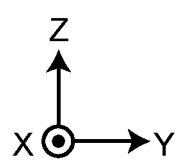

FIG.13

| (n=0) | i+1 | i+2 | i+3 | i+4 | i+5 | i+6 |
|---|---|---|---|---|---|---|
| k=1  $J_0$ | 0.3664 | 0.3664 | 0.3664 | 0.3664 | 0.3664 | 0.3664 |
| k=1  $I_0$ | →0.3627 | →0.3627 | →0.3536 | →0.3536 | →0.3627 | →0.3627 |
| k=2  $J_0$ | →0.3627 | →0.3627 | →0.3536 | →0.3536 | →0.3627 | →0.3627 |

FIG.14

| (n=+1) | i+1 | i+2 | i+3 | i+4 | i+5 | i+6 |
|---|---|---|---|---|---|---|
| J+1 | 0.3192 | 0.3192 | 0.3192 | 0.3192 | 0.3192 | 0.3192 |
| k=1 I+1 | 0.3160 → 0.0556 / 0.2604 | 0.3160 → 0.0556 / 0.2604 | 0.3080 → 0.0542 / 0.2538 | 0.3080 → 0.0542 / 0.2538 | 0.3160 → 0.0556 / 0.2604 | 0.3160 → 0.0556 / 0.2604 |
| k=2 J+1 | 0.3160 | 0.3160 | 0.3094 | 0.3080 | 0.3146 | 0.3160 |

FIG.15

| (n=-1) | i+1 | i+2 | i+3 | i+4 | i+5 | i+6 |
|---|---|---|---|---|---|---|
| k=1 J₋₁ | 0.3192 | 0.3192 | 0.3192 | 0.3192 | 0.3192 | 0.3192 |
| I₋₁ | 0.3160 | 0.3160 | 0.3080 | 0.3080 | 0.3160 | 0.3160 |
|  | 0.2604 / 0.0556 | 0.2604 / 0.0556 | 0.2538 / 0.0542 | 0.2538 / 0.0542 | 0.2604 / 0.0556 | 0.2604 / 0.0556 |
| k=2 J₋₁ | 0.3160 | 0.3146 | 0.3080 | 0.3094 | 0.3160 | 0.3160 |

FIG.16

| (n=+2) | i+1 | i+2 | i+3 | i+4 | i+5 | i+6 |
|---|---|---|---|---|---|---|
| k=1 J+2 | 0.2064 → 0.2043 | 0.2064 → 0.2043 | 0.2064 → 0.1992 | 0.2064 → 0.1992 | 0.2064 → 0.2043 | 0.2064 → 0.2043 |
| k=1 I+2 | 0.0744 / 0.1300 | 0.0744 / 0.1300 | 0.0725 / 0.1267 | 0.0725 / 0.1267 | 0.0744 / 0.1300 | 0.0744 / 0.1300 |
| k=2 J+2 | 0.2043 | 0.2043 | 0.2011 | 0.1992 | 0.2025 | 0.2043 |

FIG.17

| (n=−2) | i+1 | i+2 | i+3 | i+4 | i+5 | i+6 |
|---|---|---|---|---|---|---|
| J₋₂ | 0.2064 | 0.2064 | 0.2064 | 0.2064 | 0.2064 | 0.2064 |
| k=1 I₋₂ | 0.2043 → 0.1300 / 0.0744 | 0.2043 → 0.1300 / 0.0744 | 0.1992 → 0.1267 / 0.0725 | 0.1992 → 0.1267 / 0.0725 | 0.2043 → 0.1300 / 0.0744 | 0.2043 → 0.1300 / 0.0744 |
| k=2 J₋₂ | 0.2043 | 0.2025 | 0.1992 | 0.2011 | 0.2043 | 0.2043 |

FIG.18

| (n=+3) | | i+1 | i+2 | i+3 | i+4 | i+5 | i+6 |
|---|---|---|---|---|---|---|---|
| k=1 | $J_{+3}$ | 0.0912 | 0.0912 | 0.0912 | 0.0912 | 0.0912 | 0.0912 |
| | $I_{+3}$ | 0.0903 → 0.0521 / 0.0382 | 0.0903 → 0.0521 / 0.0382 | 0.0880 → 0.0508 / 0.0372 | 0.0880 → 0.0508 / 0.0372 | 0.0903 → 0.0521 / 0.0382 | 0.0903 → 0.0521 / 0.0382 |
| k=2 | $J_{+3}$ | 0.0903 | 0.0903 | 0.0893 | 0.0880 | 0.0890 | 0.0903 |

FIG.19

| (n=-3) | i+1 | i+2 | i+3 | i+4 | i+5 | i+6 |
|---|---|---|---|---|---|---|
| k=1 J₋₃ | 0.0912 | 0.0912 | 0.0912 | 0.0912 | 0.0912 | 0.0912 |
| k=1 I₋₃ | 0.0903 | 0.0903 | 0.0880 | 0.0880 | 0.0903 | 0.0903 |
|  | 0.0382 / 0.0521 | 0.0382 / 0.0521 | 0.0372 / 0.0508 | 0.0372 / 0.0508 | 0.0382 / 0.0521 | 0.0382 / 0.0521 |
| k=2 J₋₃ | 0.0903 | 0.0890 | 0.0880 | 0.0893 | 0.0903 | 0.0903 |

FIG.22

| (n=0) | i+1 | i+2 | i+3 | i+4 | i+5 | i+6 |
|---|---|---|---|---|---|---|
| $J_0$ | 0.3627 | 0.3627 | 0.3536 | 0.3536 | 0.3627 | 0.3627 |
| k=2  $I_0$ | →0.3591 | →0.3591 | →0.3409 | →0.3409 | →0.3591 | →0.3591 |
| k=3  $J_0$ | →0.3591 | →0.3591 | →0.3409 | →0.3409 | →0.3591 | →0.3591 |

FIG.23

| (n=+1) | i+1 | i+2 | i+3 | i+4 | i+5 | i+6 |
|---|---|---|---|---|---|---|
| k=2  J+1 | 0.3160 → 0.3128 | 0.3160 → 0.3128 | 0.3094 → 0.2983 | 0.3080 → 0.2970 | 0.3146 → 0.3115 | 0.3160 → 0.3128 |
| k=2  I+1 | 0.0551 / 0.2578 | 0.0551 / 0.2578 | 0.0525 / 0.2458 | 0.0523 / 0.2447 | 0.0548 / 0.2566 | 0.0551 / 0.2578 |
| k=3  J+1 | 0.3128 | 0.3128 | 0.3009 | 0.2972 | 0.3089 | 0.3126 |

FIG.24

| (n=-1) | | i+1 | i+2 | i+3 | i+4 | i+5 | i+6 |
|---|---|---|---|---|---|---|---|
| k=2 | $J_{-1}$ | 0.3160 | 0.3146 | 0.3080 | 0.3094 | 0.3160 | 0.3160 |
| | $I_{-1}$ | 0.3128 | 0.3115 | 0.2970 | 0.2983 | 0.3128 | 0.3128 |
| | | 0.2578 / 0.0551 | 0.2566 / 0.0548 | 0.2447 / 0.0523 | 0.2458 / 0.0525 | 0.2578 / 0.0551 | 0.2578 / 0.0551 |
| k=3 | $J_{-1}$ | 0.3126 | 0.3089 | 0.2972 | 0.3009 | 0.3128 | 0.3128 |

FIG.25

| (n=+2) | i+1 | i+2 | i+3 | i+4 | i+5 | i+6 |
|---|---|---|---|---|---|---|
| k=2 $J_{+2}$ | 0.2043 → 0.2023 | 0.2043 → 0.2023 | 0.2011 → 0.1939 | 0.1992 → 0.1920 | 0.2025 → 0.2004 | 0.2043 → 0.2023 |
| $I_{+2}$ | 0.0736 / 0.1287 | 0.0736 / 0.1287 | 0.0706 / 0.1233 | 0.0699 / 0.1221 | 0.0730 / 0.1275 | 0.0736 / 0.1287 |
| k=3 $J_{+2}$ | 0.2023 | 0.2023 | 0.1969 | 0.1927 | 0.1974 | 0.2016 |

FIG.26

| (n=-2) | i+1 | i+2 | i+3 | i+4 | i+5 | i+6 |
|---|---|---|---|---|---|---|
| $J_{-2}$ | 0.2043 → | 0.2025 → | 0.1992 → | 0.2011 → | 0.2043 → | 0.2043 → |
| k=2 $I_{-2}$ | 0.2023 | 0.2004 | 0.1920 | 0.1939 | 0.2023 | 0.2023 |
| | 0.1287 / 0.0736 | 0.1275 / 0.0730 | 0.1221 / 0.0699 | 0.1233 / 0.0706 | 0.1287 / 0.0736 | 0.1287 / 0.0736 |
| k=3 $J_{-2}$ | 0.2016 | 0.1974 | 0.1927 | 0.1969 | 0.2023 | 0.2023 |

FIG.27

| (n=+3) | | i+1 | i+2 | i+3 | i+4 | i+5 | i+6 |
|---|---|---|---|---|---|---|---|
| | $J_{+3}$ | 0.0903 | 0.0903 | 0.0893 | 0.0880 | 0.0890 | 0.0903 |
| k=2 | $I_{+3}$ | 0.0894 → 0.0516 / 0.0378 | 0.0894 → 0.0516 / 0.0378 | 0.0861 → 0.0497 / 0.0364 | 0.0849 → 0.0490 / 0.0359 | 0.0881 → 0.0508 / 0.0373 | 0.0894 → 0.0516 / 0.0378 |
| k=3 | $J_{+3}$ | 0.0894 | 0.0894 | 0.0880 | 0.0856 | 0.0862 | 0.0886 |

FIG.28

| (n=-3) | i+1 | i+2 | i+3 | i+4 | i+5 | i+6 |
|---|---|---|---|---|---|---|
| $J_{-3}$, k=2 | 0.0903 → 0.0894 | 0.0890 → 0.0881 | 0.0880 → 0.0849 | 0.0893 → 0.0861 | 0.0903 → 0.0894 | 0.0903 → 0.0894 |
| $I_{-3}$, k=2 | 0.0378 / 0.0516 | 0.0373 / 0.0508 | 0.0359 / 0.0490 | 0.0364 / 0.0497 | 0.0378 / 0.0516 | 0.0378 / 0.0516 |
| $J_{-3}$, k=3 | 0.0886 | 0.0862 | 0.0856 | 0.0880 | 0.0894 | 0.0894 |

DISPLAY DEVICE

CROSS-REFERENCE TO RELATED APPLICATION

This application claims the benefit of priority from Japanese Patent Application No. 2022-184093 filed on Nov. 17, 2022, the entire contents of which are incorporated herein by reference.

BACKGROUND

1. Technical Field

What is disclosed herein relates to a display device.

2. Description of the Related Art

Japanese Patent Application Laid-open Publication No. 2020-160254 (JP-A-2020-160254) discloses a display device having a configuration with which the background on one of plate surfaces of a display panel can be visually recognized from the other plate surface side. The display device disclosed in JP-A-2020-160254 is what is called a see-through display and includes a display panel and a light source disposed facing a side surface of the display panel, the display panel including a liquid crystal layer containing polymer-dispersed liquid crystal.

In the display device of JP-A-2020-160254, light of the light source (light source device) is incident on a first side surface of the display panel and propagates in the display panel toward a second side surface opposite to the first side surface. Elements such as switching elements and electrodes are disposed in the display panel and consume part of light of the light source device propagating in the display panel. Thus, the amount of light of the light source device decreases as the light of the light source device propagates in the display panel. As a result, the amount of light of the light source device on the second side surface side is smaller than the amount of light of the light source device on the first side surface side of the display panel. In this case, the luminance of a pixel on the second side surface side is lower than the luminance of a pixel on the first side surface side when a plurality of gradation values corresponding to a plurality of pixels are equal to one another. Consequently, desired luminance of a pixel potentially cannot be obtained on the second side surface side of the display panel.

For the foregoing reasons, there is a need for a display device, which includes a display panel on which light of a light source device is incident from a lateral side thereof, capable of equalizing luminance among a plurality of pixels when a plurality of gradation values corresponding to the pixels are equal to one another.

SUMMARY

According to an aspect, a display device includes: a display panel including a display region overlapping a plurality of pixels in a plan view and having a first side surface and a second side surface opposite to the first side surface, the plurality of pixels being arranged in a matrix of rows and columns; a light source device disposed on a side of the first side surface and configured to emit light that enters the display panel from the first side surface; and a drive circuit configured to calculate an output gradation value (an output gray level) based on an input gradation value (an input gray level) included in an image signal and to output a pixel drive signal corresponding to the output gradation value to a corresponding one pixel of the plurality of pixels. The plurality of pixels include a first pixel and a second pixel that are arranged in a first direction from the first side surface toward the second side surface. The second pixel is disposed between the first pixel and the second side surface. When the input gradation value corresponding to the first pixel is equal to the input gradation value corresponding to the second pixel, the drive circuit is configured to set the output gradation value corresponding to the second pixel to be larger than the output gradation value corresponding to the first pixel.

According to an aspect, a display device includes: a display panel including a first side surface; a plurality of light sources facing the first side surface; a first pixel disposed on the display panel; a second pixel disposed on the display panel and opposite to the first side surface with the first pixel therebetween; and a drive circuit configured to receive an image signal including a first input gradation value corresponding to the first pixel and a second input gradation value corresponding to the second pixel. The drive circuit is configured to output, to the first pixel, a first pixel drive signal including a first output gradation value corresponding to the first input gradation value and output, to the second pixel, a second pixel drive signal including a second output gradation value corresponding to the second input gradation value. When the first input gradation value is equal to the second input gradation value, the second output gradation value is larger than the first output gradation value.

According to an aspect, a display device includes: a display panel including a liquid crystal layer containing polymer-dispersed liquid crystal, a first substrate and a second substrate with the liquid crystal layer therebetween, and a third substrate disposed opposite to the first substrate with the second substrate therebetween; a plurality of light sources facing a side surface of the third substrate; a first pixel and a second pixel disposed on the display panel and arranged in a direction intersecting the side surface; and a drive circuit configured to receive an image signal including a first input gradation value corresponding to the first pixel and a second input gradation value corresponding to the second pixel. Light emitted from the plurality of light sources enters the third substrate from the side surface and is emitted from a principal surface of the third substrate. The drive circuit is configured to output, to the first pixel, a first pixel drive signal including a first output gradation value corresponding to the first input gradation value and output, to the second pixel, a second pixel drive signal including a second output gradation value corresponding to the second input gradation value. When the first input gradation value is equal to the second input gradation value, the second output gradation value is larger than the first output gradation value.

BRIEF DESCRIPTION OF THE DRAWINGS

FIG. 5 is a partially enlarged sectional view of the display panel;

FIG. 13 is a diagram illustrating the amounts of incident light ray and emission light ray at each pixel in the first row and the amount of incident light ray at each pixel in the second row when a tilt angle is 0° (n=0);

FIG. 14 is a diagram illustrating the amounts of incident light ray and emission light ray at each pixel in the first row and the amount of incident light ray at each pixel in the second row when the tilt angle is +10° (n=+1);

FIG. 15 is a diagram illustrating the amounts of incident light ray and emission light ray at each pixel in the first row and the amount of incident light ray at each pixel in the second row when the tilt angle is −10° (n=−1);

FIG. 16 is a diagram illustrating the amounts of incident light ray and emission light ray at each pixel in the first row and the amount of incident light ray at each pixel in the second row when the tilt angle is +20° (n=+2);

FIG. 17 is a diagram illustrating the amounts of incident light ray and emission light ray at each pixel in the first row and the amount of incident light ray at each pixel in the second row when the tilt angle is −20° (n=−2);

FIG. 18 is a diagram illustrating the amounts of incident light ray and emission light ray at each pixel in the first row and the amount of incident light ray at each pixel in the second row when the tilt angle is +30° (n=+3);

FIG. 19 is a diagram illustrating the amounts of incident light ray and emission light ray at each pixel in the first row and the amount of incident light ray at each pixel in the second row when the tilt angle is −30° (n=−3);

FIG. 22 is a diagram illustrating the amounts of incident light ray and emission light ray at each pixel in the second row and the amount of incident light ray at each pixel in the third row when the tilt angle is 0° (n=0);

FIG. 23 is a diagram illustrating the amounts of incident light ray and emission light ray at each pixel in the second row and the amount of incident light ray at each pixel in the third row when the tilt angle is +10° (n=+1);

FIG. 24 is a diagram illustrating the amounts of incident light ray and emission light ray at each pixel in the second row and the amount of incident light ray at each pixel in the third row when the tilt angle is −10° (n=−1);

FIG. 25 is a diagram illustrating the amounts of incident light ray and emission light ray at each pixel in the second row and the amount of incident light ray at each pixel in the third row when the tilt angle is +20° (n=+2);

FIG. 26 is a diagram illustrating the amounts of incident light ray and emission light ray at each pixel in the second row and the amount of incident light ray at each pixel in the third row when the tilt angle is −20° (n=−2);

FIG. 27 is a diagram illustrating the amounts of incident light ray and emission light ray at each pixel in the second row and the amount of incident light ray at each pixel in the third row when the tilt angle is +30° (n=+3);

FIG. 28 is a diagram illustrating the amounts of incident light ray and emission light ray at each pixel in the second row and the amount of incident light ray at each pixel in the third row when the tilt angle is −30° (n=−3)

DETAILED DESCRIPTION

Figure 1:
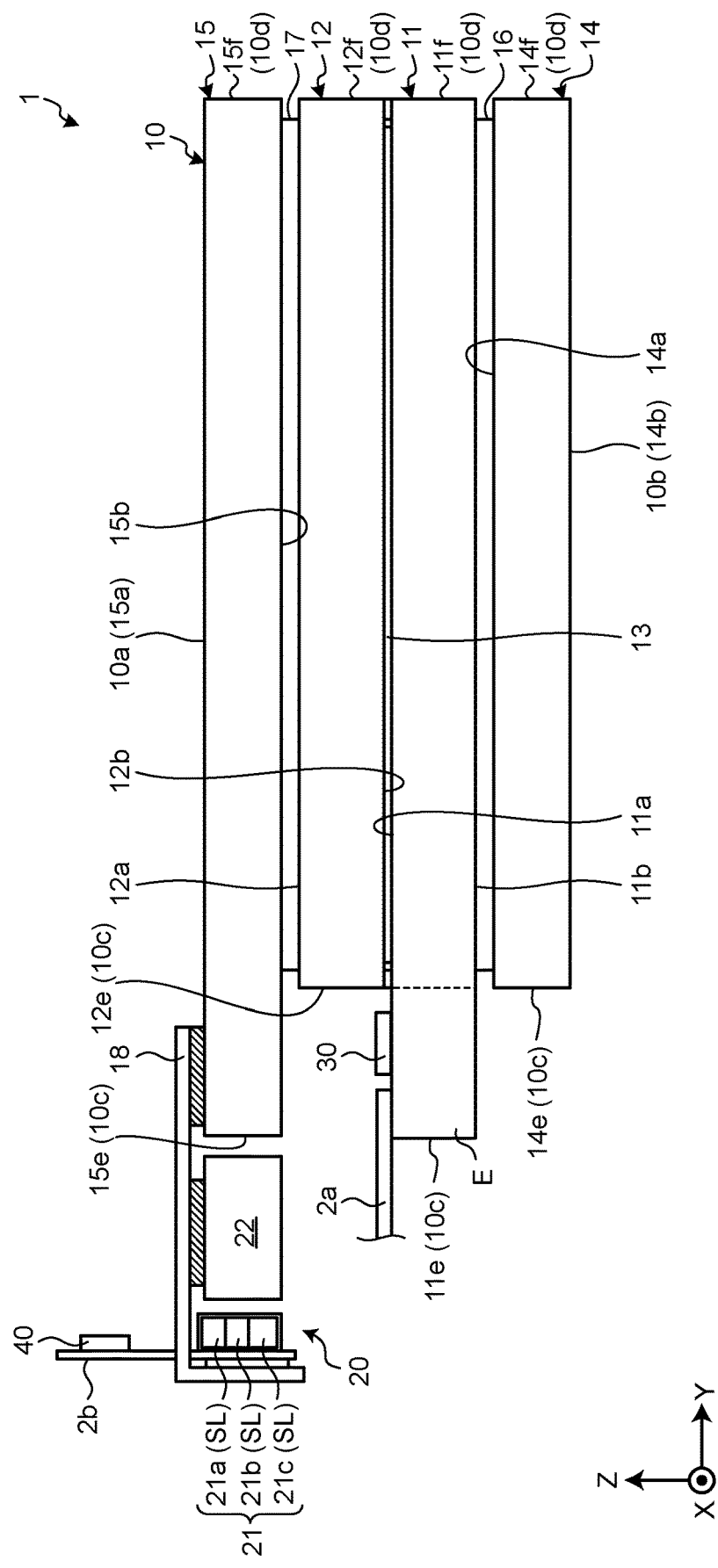
FIG. 1 is a diagram illustrating the configuration of a display device according to an embodiment of the present disclosure.

An embodiment of the present disclosure will be described below with reference to the accompanying drawings. Contents described below in the embodiment do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is included in the scope of the present disclosure. In the drawings, the width, thickness, shape, and the like of each component are schematically illustrated for clearer description as compared to actual aspects in some cases, but are merely exemplary and do not limit interpretation of the present disclosure. In the present specification and the drawings, any component same as that already described with reference to an already described drawing is denoted by the same reference sign, and detailed description thereof is omitted as appropriate in some cases.

An X direction and a Y direction illustrated in the drawings correspond to directions parallel to the plate surface of a substrate included in a display device 1. A +X side and a −X side in the X direction and a +Y side and a −Y side in the Y direction correspond to lateral sides of the display device 1. A Z direction corresponds to the thickness direction of the display device 1. A +Z side in the Z direction corresponds to a front surface side of the display device 1 on which an image is displayed. A −Z side in the Z direction corresponds to a back surface side of the display device 1. In the present specification, a "plan view" refers to viewing the display device 1 from the +Z side toward the −Z side along the Z direction. The X direction corresponds to a third direction, and the Y direction corresponds to a first direction. The X, Y, and Z directions are exemplary and do not limit the present disclosure.

Figure 2:
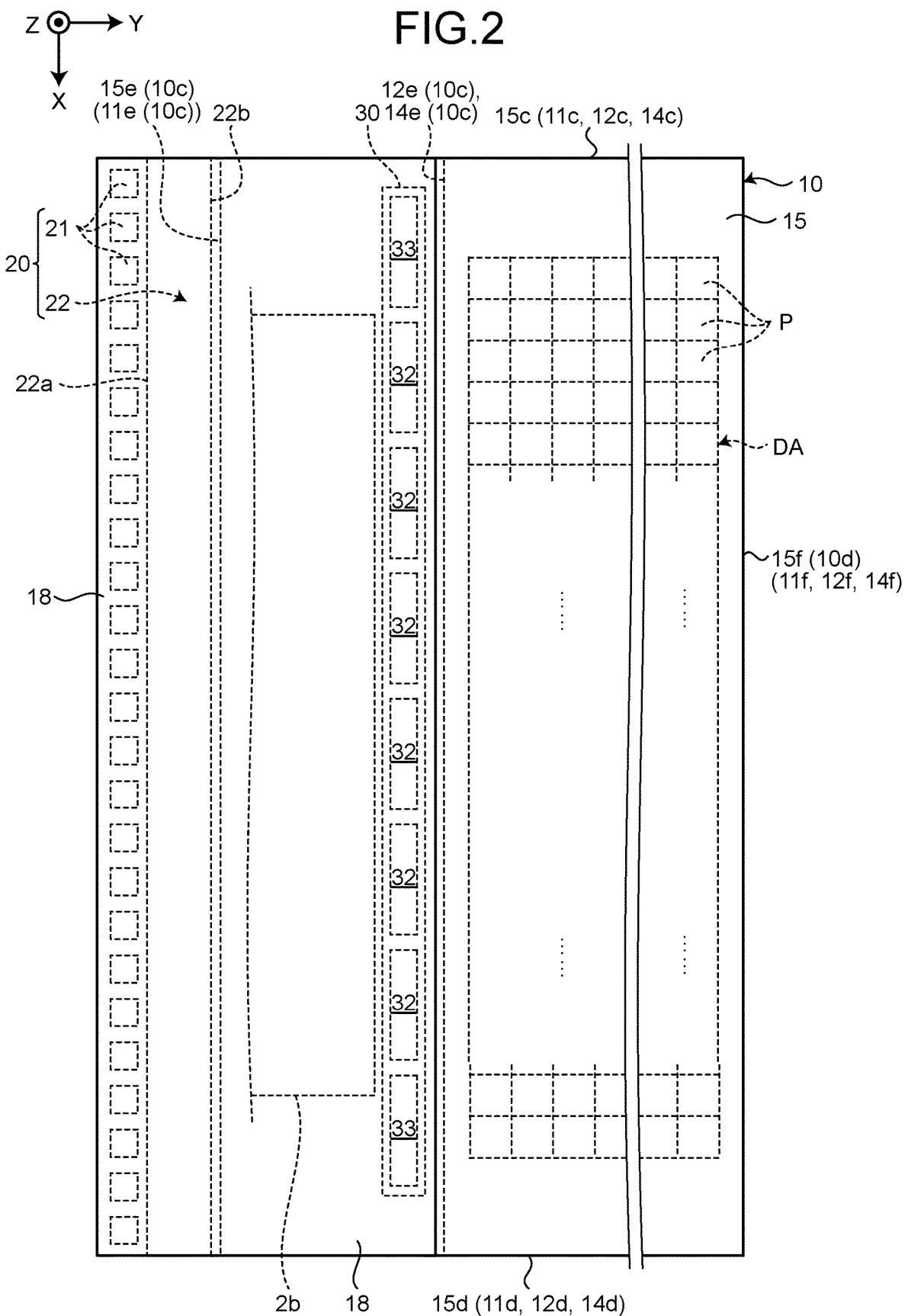
FIG. 2 is a plan view of the display device.

FIG. 1 is a diagram illustrating the configuration of the display device 1 according to an embodiment of the present disclosure. FIG. 2 is a plan view of the display device 1. The display device 1 displays an image based on an image signal output from an external device (not illustrated) electrically coupled through a first flexible wiring substrate 2a. The display device 1 includes a display panel 10, a light source device 20, a first drive circuit 30, and a second drive circuit 40.

The display panel 10 is what is called a see-through display (transparent display). In the display panel 10, the background on one plate surface (for example, a back surface 10b) side of the display panel 10 can be visually recognized from the other plate surface (for example, a front surface 10a) side. The display panel 10 has a display region DA in which an image is displayed on a plate surface (the front surface 10a). The display panel 10 includes a first substrate 11, a second substrate 12, a liquid crystal layer 13, a first base member 14, and a second base member 15 (corresponding to a third substrate).

The first substrate 11 and the second substrate 12 each have a rectangular shape in a plan view and have a property of transmitting light. The first substrate 11 and the second substrate 12 are made of, for example, resin such as polyethylene terephthalate, or glass. The first substrate 11 includes an exposed part E exposed from the second substrate 12 in a plan view. The first substrate 11 is disposed on a back surface 12b side of the second substrate 12. A front surface 11a of the first substrate 11 and the back surface 12b of the second substrate 12 face each other. The liquid crystal layer 13 is disposed between the first substrate 11 and the second substrate 12.

As illustrated in FIG. 2, the display region DA overlaps a plurality of pixels P in a plan view, the pixels P being arranged in a matrix of rows and columns in the X and Y directions. Each pixel P has a square shape in a plan view. Details of the liquid crystal layer 13 and the pixels P will be described later.

The first base member 14 and the second base member 15 illustrated in FIGS. 1 and 2 protect the first substrate 11, the second substrate 12, and the liquid crystal layer 13. The first base member 14 and the second base member 15 each have a rectangular shape in a plan view and have a property of transmitting light. The first base member 14 and the second base member 15 are made of, for example, glass or resin. The first base member 14 is bonded to a back surface 11b of the first substrate 11 through a first bonding agent part 16. The second base member 15 is bonded to a front surface 12a of the second substrate 12 through a second bonding agent part 17. The first bonding agent part 16 and the second bonding agent part 17 have a property of transmitting light and formed by curing a bonding agent.

The front surface 11a and the back surface 11b of the first substrate 11, the front surface 12a and the back surface 12b of the second substrate 12, a front surface 14a and a back surface 14b of the first base member 14, and a front surface 15a (corresponding to a principal surface of the third substrate) and a back surface 15b of the second base member 15 are flat surfaces and parallel to one another. The front surface 15a of the second base member 15 corresponds to the front surface 10a of the display panel 10, and the back surface 14b of the first base member 14 corresponds to the back surface 10b of the display panel 10.

A first XL side surface 11c, a second XL side surface 12c, a third XL side surface 14c, and a fourth XL side surface 15c that are side surfaces of the first substrate 11, the second substrate 12, the first base member 14, and the second base member 15 on the −X side are flat surfaces and parallel to one another. In addition, a first XR side surface 11d, a second XR side surface 12d, a third XR side surface 14d, and a fourth XR side surface 15d that are side surfaces of the first substrate 11, the second substrate 12, the first base member 14, and the second base member 15 on the +X side are flat surfaces and parallel to one another.

A first YB side surface 11e, a second YB side surface 12e, a third YB side surface 14e, and a fourth YB side surface 15e that are side surfaces of the first substrate 11, the second substrate 12, the first base member 14, and the second base member 15 on the −Y side are flat surfaces and parallel to one another. The first YB side surface 11e, the second YB side surface 12e, the third YB side surface 14e, and the fourth YB side surface 15e correspond to a first side surface 10c of the display panel 10.

A first YF side surface 11f, a second YF side surface 12f, a third YF side surface 14f, and a fourth YF side surface 15f that are side surfaces of the first substrate 11, the second substrate 12, the first base member 14, and the second base member 15 on the +Y side are flat surfaces and parallel to one another. The first YF side surface 11f, the second YF side surface 12f, the third YF side surface 14f, and the fourth YF side surface 15f correspond to a second side surface 10d of the display panel 10. The second side surface 10d is opposite to the first side surface 10c.

The light source device 20 is disposed on a lateral side of the display panel 10. Specifically, the light source device 20 is disposed on the first side surface 10c side of the display panel 10 and faces the fourth YB side surface 15e of the second base member 15. The light source device 20 emits light that enters the display panel 10 from the first side surface 10c (to be described later in detail). The light source device 20 is fixed to the second base member 15 through a support 18. The light source device 20 includes a light emitter 21 and a light guide 22.

A plurality of light emitters 21 are provided and arranged in the X direction. The light emitter 21 includes a first light source 21a of a first color, a second light source 21b of a second color, and a third light source 21c of a third color. The first color, the second color, and the third color are different from one another. The first color is red, the second color is green, and the third color is blue. Specifically, the color of light from the first light source 21a is red, the color of light from the second light source 21b is green, and the color of light from the third light source 21c is blue. Hereinafter, the first light source 21a, the second light source 21b, and the third light source 21c are simply referred to as "light sources SL" when described without distinction.

The number of light sources SL included in the light emitter 21 and the colors of light therefrom are not limited to the above-described number and colors. For example, the number of light sources SL may be one and the color of the light source SL may be white. In this case, a gray scale or black-and-white image is displayed in the display region DA.

Each light source SL emits light toward the light guide 22. Each light source SL is, for example, a light emitting diode (LED). Light of the light sources SL corresponds to light of the light source device 20.

The light guide 22 has a rectangular parallelepiped shape and has a facing surface 22a facing the light sources SL, and a facing surface 22b disposed opposite the facing surface 22a and facing the fourth YB side surface 15e of the second base member 15. The shape of the light guide 22 is continuous from the fourth XL side surface 15c to the fourth XR side surface 15d in a plan view. The light guide 22 has a property of transmitting light. Light of the light sources SL is incident on the light guide 22 through the facing surface 22a, diffused in the light guide 22, and emitted from the facing surface 22b toward the fourth YB side surface 15e of the second base member 15 with equalized light amount.

Light of the light sources SL that enters the display panel from the fourth YB side surface 15e of the second base member 15 propagates in the display panel 10 from the first side surface 10c of the display panel 10 toward the second side surface 10d opposite to the first side surface 10c. Specifically, light of the light sources SL is reflected by the front surfaces 11a, 12a, 14a, and 15a and the back surfaces 11b, 12b, 14b, and 15b of the first substrate 11, the second substrate 12, the first base member 14, and the second base member 15 in the display panel 10 and propagates to the second side surface 10d.

Figure 3:
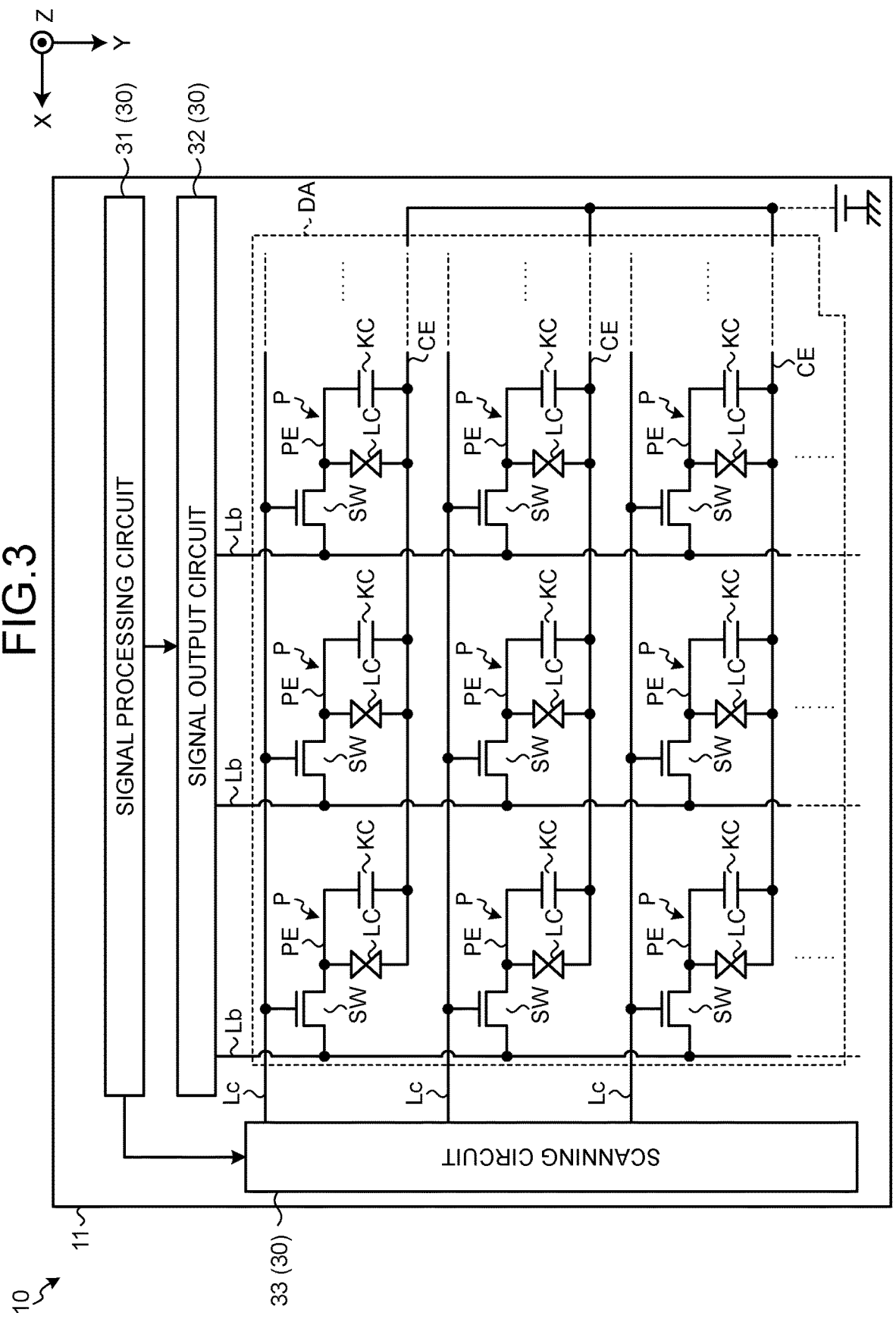
FIG. 3 is a diagram illustrating a circuit configuration of the display device.

FIG. 3 is a diagram illustrating a circuit configuration of the display device 1. As illustrated in FIGS. 1 and 3, the first drive circuit 30 is disposed on the first substrate 11. The first drive circuit 30 calculates output gradation values, which will be described later, based on an image signal transmitted from the external device. The first drive circuit 30 applies voltage to the pixels P in accordance with the output gradation values (to be described later in detail). The first drive circuit 30 includes a signal processing circuit 31, a signal output circuit 32, and a scanning circuit 33.

The signal processing circuit 31 generates a plurality of pixel drive signals based on the image signal (to be described later in detail) and outputs the pixel drive signals to the signal output circuit 32. In addition, the signal processing circuit 31 outputs, to the signal output circuit 32 and the scanning circuit 33, a clock signal that synchronizes operation of the signal output circuit 32 and operation of the scanning circuit 33.

The signal output circuit 32 outputs the pixel drive signals to the corresponding pixels P. As illustrated in FIG. 3, the signal output circuit 32 is electrically coupled to the pixels P through a plurality of signal lines Lb extending in the Y direction.

The scanning circuit 33 scans the pixels P in synchronization with the outputting of the pixel drive signals from the signal output circuit 32. The scanning circuit 33 is electrically coupled to the pixels P through a plurality of scanning lines Lc extending in the X direction.

Each of the pixels P includes a switching element SW, a pixel electrode PE, a common electrode CE, a liquid crystal capacitor LC, and a holding capacitor KC.

The switching element SW is formed of, for example, a thin film transistor (TFT). In the switching element SW, a source electrode is electrically coupled to the corresponding signal line Lb, and a gate electrode is electrically coupled to the corresponding scanning line Lc.

The pixel electrode PE is coupled to a drain electrode of the switching element SW. A plurality of the common electrodes CE are disposed for the scanning lines Lc, respectively. Each pixel electrode PE and each common electrode CE have a property of transmitting light.

The liquid crystal capacitor LC is a capacitor component of a liquid crystal material of the liquid crystal layer 13, which will be described later, between the pixel electrode PE and the common electrode CE. The holding capacitor KC is disposed between an electrode equipotential to the common electrode CE and an electrode equipotential to the pixel electrode PE.

Figure 4:
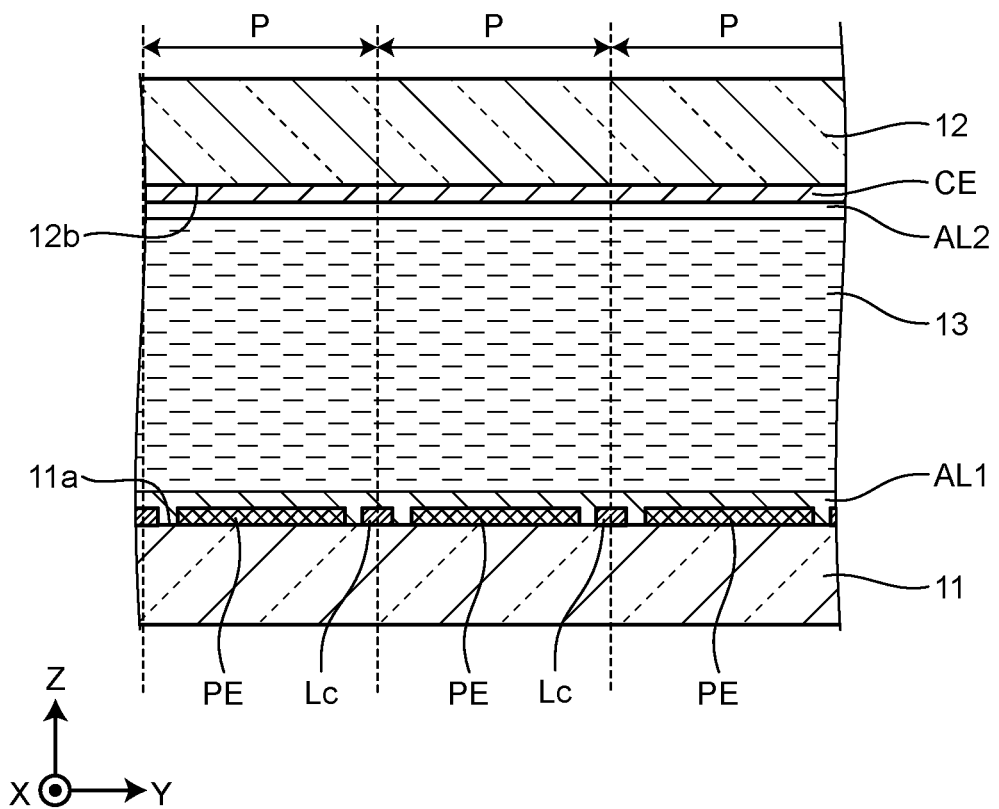
FIG. 4 is a sectional view of a display panel.

FIG. 4 is a sectional view of the display panel 10. In FIG. 4, the first base member 14 and the second base member 15 are omitted. The signal lines Lb (not illustrated), the pixel electrodes PE, and the scanning lines Lc are disposed on the front surface 11a of the first substrate 11 and electrically insulated from one another. Each region partitioned by two signal lines Lb adjacent to each other and two scanning lines Lc adjacent to each other in a plan view in the display panel 10 corresponds to a pixel P.

A first alignment film AL1 is disposed on the front surface 11a of the first substrate 11. The first alignment film AL1 has an alignment direction along the Y direction. The signal lines Lb, the pixel electrodes PE, and the scanning lines Lc are disposed between the first substrate 11 and the first alignment film AL1.

The common electrodes CE and a second alignment film AL2 are disposed on the back surface 12b of the second substrate 12. The common electrodes CE are disposed between the second substrate 12 and the second alignment film AL2. The second alignment film AL2 has an alignment direction along the Y direction. Thus, the alignment direction of the first alignment film AL1 and the alignment direction of the second alignment film AL2 are parallel to each other. The alignment direction of the first alignment film AL1 and the alignment direction of the second alignment film AL2 may be orthogonal to each other.

FIG. 5 is a partially enlarged sectional view of the display panel 10. The liquid crystal layer 13 contains polymer-dispersed liquid crystal. Specifically, the liquid crystal layer 13 includes a polymer network 51 having a three-dimensional net shape and liquid crystal molecules 52.

The polymer network 51 is formed as monomers aligned by the first alignment film AL1 and the second alignment film AL2 are polymerized with ultraviolet light, heat, or the like. The liquid crystal molecules 52 are positioned in gaps of the polymer network 51.

As illustrated in FIG. 1, the second drive circuit 40 is provided to the support 18. The second drive circuit 40 drives the light source device 20 in accordance with a light control signal output from an external device (not illustrated) electrically coupled through a second flexible wiring substrate 2b. The control signal includes information on the light amount of each light source SL (the amount of light emitted from the light source), which is determined based on an image signal.

The following describes basic operation of the display device 1 when the display panel 10 displays an image. The first drive circuit 30 and the second drive circuit 40 drive the display panel 10 and the light source device 20 by a field sequential system.

The following first describes a case in which no image signal nor light control signal is transmitted to the display device 1 and no image is displayed on the display panel 10. In this case, no pixel drive signals are output from the first drive circuit 30, and no voltage is applied to the pixel electrodes PE. Furthermore, the light source device 20 is not driven by the second drive circuit 40, and no light is emitted from the light sources SL.

When no voltage is applied to the pixel electrodes PE, an optical axis AX1 of the polymer network 51 and an optical axis AX2 of each liquid crystal molecule 52 are regulated by the alignment directions of the first alignment film AL1 and the second alignment film AL2 as illustrated in FIG. 5. In the present embodiment, when no voltage is applied to the pixel electrodes PE, the optical axis of the polymer network 51 and the optical axis of the liquid crystal molecules 52 are parallel to each other and aligned with the Y direction.

The ordinary light refractive index of the polymer network 51 and the ordinary light refractive index of the liquid crystal molecules 52 are equal to each other. Thus, when no voltage is applied to the pixel electrodes PE, the difference between the refractive index of the polymer network 51 and the refractive index of the liquid crystal molecules 52 is 0 in all directions. Thus, light propagating in the display panel 10 is not scattered. In other words, in this case, the liquid crystal layer 13 is in a transmitting state in which the liquid crystal layer 13 does not scatter light propagating in the display panel 10.

When the liquid crystal layer 13 is in the transmitting state, the background on one plate surface (for example, the back surface 10b) side of the display panel 10 can be visually recognized from the other plate surface (for example, the front surface 10a) side of the display panel 10. When the liquid crystal layer 13 is in the transmitting state, light of the light sources SL propagating in the display panel 10 is hardly scattered. Thus, when the liquid crystal layer 13 is in the transmitting state, the background of one plate surface side of the display panel 10 can be visually recognized from the other plate surface side of the display panel 10 even if light is emitted from the light sources SL in accordance with a light control signal.

The following describes a case in which an image signal and a light control signal is transmitted to the display device 1 and an image is displayed on the display panel 10. The description is first made on a state in which pixel drive signals are output from the first drive circuit 30 and voltage is applied to the pixel electrodes PE.

When voltage is applied to the pixel electrodes PE, the optical axis AX2 of each liquid crystal molecule 52 is tilted relative to the Y direction in accordance with the magnitude of the voltage. However, the optical axis AX1 of the polymer network 51 is not tilted but is aligned with the Y direction even when voltage is applied to the pixel electrodes PE. In other words, the optical axis AX2 of the liquid crystal molecule 52 is tilted relative to the optical axis AX1 of the polymer network 51.

Thus, difference is generated between the refractive index of the polymer network 51 and the refractive index of the liquid crystal molecules 52. In this state, when the second drive circuit 40 emits light from the light sources SL in accordance with the light control signal, the light is scattered while propagating in the display panel 10. In other words, in this case, the liquid crystal layer 13 is in a scattering state in which the liquid crystal layer 13 scatters light propagating in the display panel 10. The light scattered by the liquid crystal layer 13 radiates out of the front surface 10a and back surface 10b of the display panel 10 and can be visually recognized from both plate surface sides of the display panel 10.

The amount of light scattered by the liquid crystal layer 13 changes with a scattering degree of the liquid crystal layer 13. The scattering degree of the liquid crystal layer 13 is determined by the tilt of each liquid crystal molecule 52, in other words, the magnitude of voltage applied to the pixel electrodes PE. The magnitude of the voltage is determined based on output gradation values included in the pixel drive signals. The output gradation values are determined by the first drive circuit 30 for the respective pixels P based on input gradation values included in the image signal. The input gradation value and the output gradation value are values (gradation values) indicating the gradations of the pixels P. The input gradation values and the output gradation values are determined for each pixel color. The number of pixel colors is three, and the colors of the light sources SL correspond to the pixel colors.

The first drive circuit 30 generates, for each of the pixels P, a pixel drive signal including an output gradation value determined based on the corresponding input gradation value and transmits the pixel drive signal to the pixel P. Thus, at each of the pixels P, voltage corresponding to the output gradation value is applied to the pixel electrode PE, and the liquid crystal molecules 52 corresponding to the pixel P are tilted in accordance with the magnitude of the output gradation value to change the scattering degree of the liquid crystal layer 13, thereby changing the amount of externally output light. As the output gradation value is larger, the voltage applied to the pixel electrode PE is larger, the amount of externally output light is larger, and the luminance of the pixel P visually recognized from both plate surfaces (the front surface 10a and the back surface 10b) side of the display panel 10 is higher.

Figure 6:
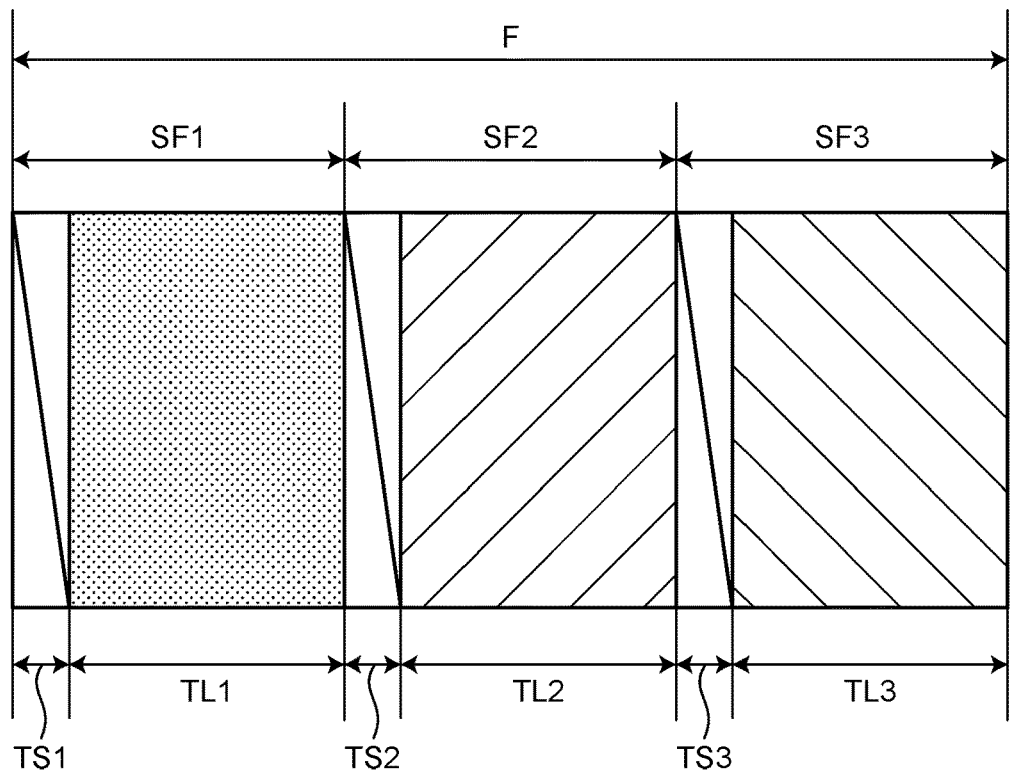
FIG. 6 is a timing diagram illustrating operation of a first drive circuit and a second drive circuit when an image is displayed on the display panel.

FIG. 6 is a timing diagram illustrating operation of the first drive circuit 30 and the second drive circuit 40 when an image is displayed on the display panel 10. FIG. 6 illustrates operation of the first drive circuit 30 and the second drive circuit 40 for one frame F. One frame F includes a first subframe SF1, a second subframe SF2, and a third subframe SF3 in the order as listed.

In the first subframe SF1, light of the first color (red) included in the image is output from pixels P. Specifically, the first drive circuit 30 scans the pixels P in a first scanning period TS1, selects pixels P from which first-color light is to be output, and transmits pixel drive signals corresponding to the first color to the selected pixels P. Thus, the liquid crystal layer 13 corresponding to the selected pixels P becomes a scattering state corresponding to output gradation values corresponding to the first color. Voltage applied to the pixel electrodes PE is held in a first light emission period TL1 and reset at end of the first subframe SF1.

In addition, the second drive circuit 40 causes the first light source 21a to emit light in the first light emission period TL1. First-color light from the first light source 21a propagates in the display panel 10. Thus, in the liquid crystal layer 13 corresponding to the pixels P selected by the first drive circuit 30, the first-color light is scattered in accordance with the scattering degree of the liquid crystal layer 13 and is externally output. As a result, the first-color light having gradations corresponding to the output gradation values is output from the pixels P selected by the first drive circuit 30.

In the second subframe SF2, light of the second color (green) included in the image is output from pixels P. Specifically, the first drive circuit 30 scans the pixels P in a second scanning period TS2, selects pixels P from which second-color light is to be output, and transmits pixel drive signals corresponding to the second color to the selected pixels P. Thus, the liquid crystal layer 13 corresponding to the selected pixels P becomes a scattering state corresponding to output gradation values corresponding to the second color. Voltage applied to the pixel electrodes PE is held in a second light emission period TL2 and reset at end of the second subframe SF2.

In addition, the second drive circuit 40 causes the second light source 21b to emit light in the second light emission period TL2. Second-color light from the second light source 21b propagates in the display panel 10. Thus, in the liquid crystal layer 13 corresponding to the pixels P selected by the first drive circuit 30, the second-color light is scattered in accordance with the scattering degree of the liquid crystal layer 13 and is externally output. As a result, the second-color light having gradations corresponding to the output gradation values is output from the pixels P selected by the first drive circuit 30.

In the third subframe SF3, light of the third color (blue) included in the image is output from pixels P. Specifically, the first drive circuit 30 scans the pixels P in a third scanning period TS3, selects pixels P from which third-color light is to be output, and transmits pixel drive signals corresponding to the third color to the selected pixels P. Thus, the liquid crystal layer 13 corresponding to the selected pixels P becomes a scattering state corresponding to the output gradation values corresponding to the third color. Voltage applied to the pixel electrodes PE is held in a third light emission period TL3 and reset at end of the third subframe SF3.

In addition, the second drive circuit 40 causes the third light source 21c to emit light in the third light emission period TL3. Third-color light from the third light source 21c propagates in the display panel 10. Thus, in the liquid crystal layer 13 corresponding to the pixels P selected by the first drive circuit 30, the third-color light is scattered in accordance with the scattering degree of the liquid crystal layer 13 and is externally output. As a result, the third-color light having gradations corresponding to the output gradation values is output from the pixels P selected by the first drive circuit 30.

The time period of one frame F is set to be a time period in which combined light of first-color light, second-color light, and third-color light output in one frame F is recognized by human eyes. Specifically, light having combined color and gradation of the first color, the second color, and the third color is recognized by human eyes. Thus, an image is visually recognized when first-color light, second-color light, and third-color light are output from the pixels P as described above. In this case, when the display region DA is viewed from one plate surface side of the display panel 10, the background of the other plate surface side of the display panel 10 is visually recognized while being overlapped with the image.

Such a display device 1 has problems described below. Light of the light sources SL propagates in the display panel 10 from the first side surface 10c of the display panel 10 toward the second side surface 10d as described above. Since the display panel 10 includes elements such as the signal lines Lb, the pixel electrodes PE, and the switching elements SW as described above, the light of the light sources SL bounces off the elements and is scattered. In other words, the light of the light sources SL is consumed by the elements.

Furthermore, when the liquid crystal layer 13 corresponding to an arbitrary pixel P is in the scattering state, the amount of light of the light sources SL propagating to the second side surface 10d side of the pixel P decreases as compared to a case in which the liquid crystal layer 13 corresponding to the pixel P is in the transmitting state because part of the light of the light sources SL is externally output at the pixel P. In other words, light of the light sources SL is consumed by the liquid crystal layer 13 in the scattering state. In this manner, the amount of light of the light sources SL reaching the second side surface 10d decreases as light of the light sources SL is consumed.

Figure 7:
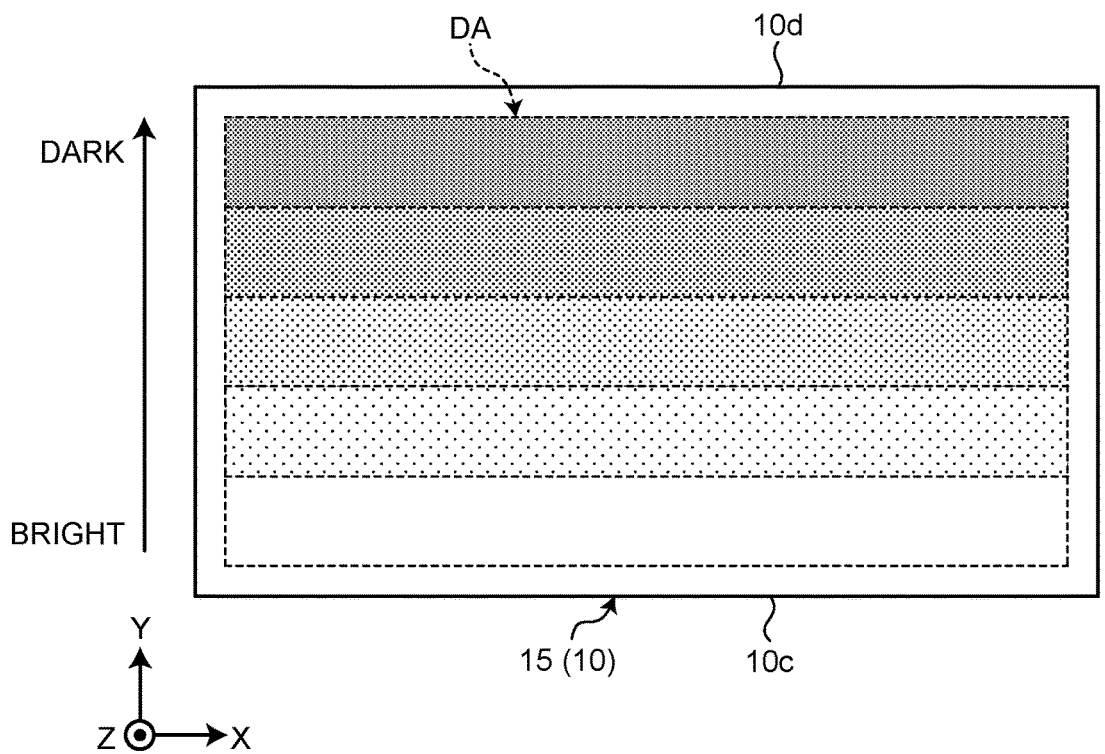
FIG. 7 is a plan view of a display region, schematically illustrating propagation of light of light sources.

FIG. 7 is a plan view of the display region DA, schematically illustrating propagation of light of the light sources SL. As light of the light sources SL is consumed as described above, the amount of light of the light sources SL decreases as the light moves from the −Y side toward the +Y side along the Y direction, in other words, from the first side surface 10c toward the second side surface 10d as illustrated in FIG. 7. In this case, when the display device 1 is operated to display white in the entire display region DA, in other words, when output gradation values corresponding to the first color, the second color, and the third color for each of the pixels P are equally set to a maximum value by the first drive circuit 30, the luminance of each pixel P, in other words, the luminance of the display region DA decreases from the first side surface 10c toward the second side surface 10d.

For example, in a case in which the luminance of any pixel P positioned farthest on the −Y side among the pixels P is defined to be 1, the luminance of any pixel P positioned farthest on the +Y side among the pixels P is smaller than 1 and is, for example, 0.6. Specifically, although the display device 1 is operated to display white in the entire display region DA, desired luminance of pixels P cannot be obtained, and gradation decreases and gray is displayed on the second side surface 10d side in the display region DA.

Furthermore, although the display device 1 is operated to display red in part of the display region DA, the complementary color (cyan) of red is displayed on the second side surface 10d side of the part of the display region DA in some cases. In this manner, when a color expressed by an input gradation value and a color displayed in the display region DA are different from each other, an image different from a desired image is potentially displayed in the display region DA.

To solve the above-described problems, the first drive circuit 30 of the present embodiment of the present disclosure calculates output gradation values as described below.

Figure 8:
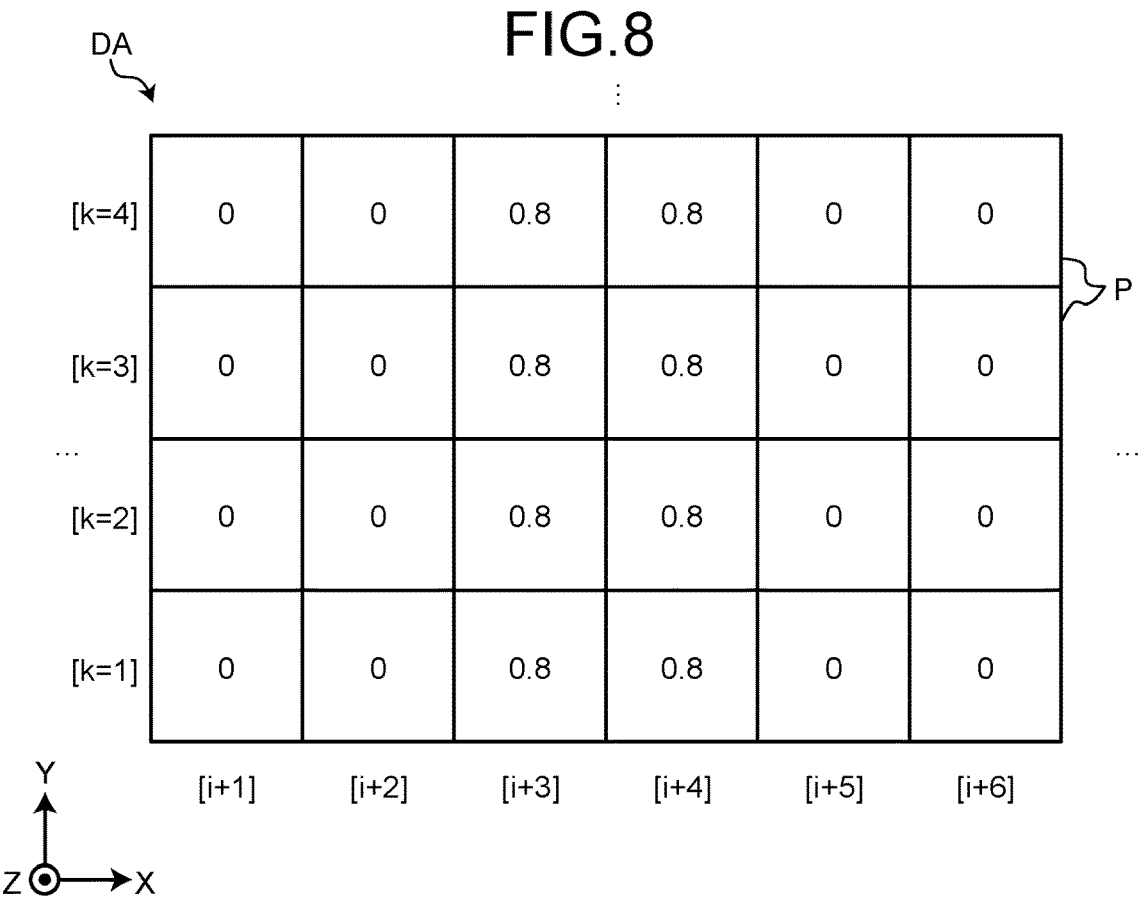
FIG. 8 is a schematic diagram of the display region.

FIG. 8 is a schematic diagram of the display region DA. The pixels P are arranged in a matrix of rows and columns in the display region DA as described above. The number of columns of pixels P arranged in the Y direction and the number of rows of pixels P arranged in the X direction are determined by the size of the display panel 10, the total number of pixels P, and the like. The number of rows of pixels P is a predetermined value (for example, 1080). The number of columns of pixels P is determined in accordance with the predetermined value and is, for example, 1920 when the number of rows of pixels P is 1080.

Hereinafter, for simplification of description, a variable indicating the row number of a pixel P is represented by "k", and the row number increases by 1 from the −Y side toward the +Y side. The maximum value of the row number is a predetermined value (for example, 1080).

In addition, a variable indicating the column number of a pixel P is represented by "i", and the column number increases by 1 from the −X side toward the +X side.

FIG. 8 illustrates some of the pixels P. Specifically, FIG. 8 illustrates a plurality of pixels P arranged in four rows and six columns. The pixels P in the four rows (k=1, 2, 3, 4) illustrated in FIG. 8 correspond to pixels P in the first row farthest on the −Y side (in other words, in a row closest to the first side surface 10c) to the fourth row. In other words, no pixels P exist on the −Y side of the pixels P in the first row (k=1), and a plurality of pixels P are arranged on the +Y side of the pixels P in the fourth row (k=4).

The pixels P in the six columns (i+1, i+2, i+3, i+4, i+5, i+6) illustrated in FIG. 8 are positioned at a substantially central part in the X direction among the pixels P arranged in the X direction. Specifically, a plurality of pixels P are arranged on the −X side of the pixels P in the (i+1)-th column, and a plurality of pixels P are arranged on the +X side of the pixels P in the (i+6)-th column.

Hereinafter, the pixel P in the k-th row and the i-th column is referred to as a pixel P(k, i). The value illustrated in each pixel P in FIG. 8 indicates an input gradation value. In the present specification, the minimum value of input gradation value and the minimum value of output gradation value are 0, and the maximum value of input gradation value and the maximum value of output gradation value are 1. Each input gradation value illustrated in FIG. 8 corresponds to the first color. The following describes a case in which output gradation values corresponding to the first color are calculated. Output gradation values are calculated for the second color and the third color in the same manner as in the case described below. Each input gradation value illustrated in FIG. 8 is a gamma-corrected value.

In the present embodiment, in the first row to the row of the predetermined value, the input gradation values of the pixels P in the (i+3)-th and (i+4)-th columns are all 0.8 for simplification of description. That is, the gradation values of the pixels P in the (i+3)-th and (i+4)-th columns in an image signal are equal to one another. Thus, the luminances of the pixels P in the (i+3)-th and (i+4)-th columns are desirably equalized.

In addition, in the first row to the row of the predetermined value, the input gradation values of the pixels P in the other columns than the (i+3)-th and (i+4)-th columns are all 0. FIG. 8 illustrates that, in the first to fourth rows (k=1, 2, 3, 4), the input gradation values of the pixels P in the (i+3)-th and (i+4)-th columns are 0.8 and the input gradation values of the pixels P in the (i+1)-th, (i+2)-th, (i+5)-th, and (i+6)-th columns are 0. The following describes the process of calculating the output gradation values of the pixels P in the six columns illustrated in FIG. 8 based on the input gradation values illustrated in FIG. 8.

Figure 9:
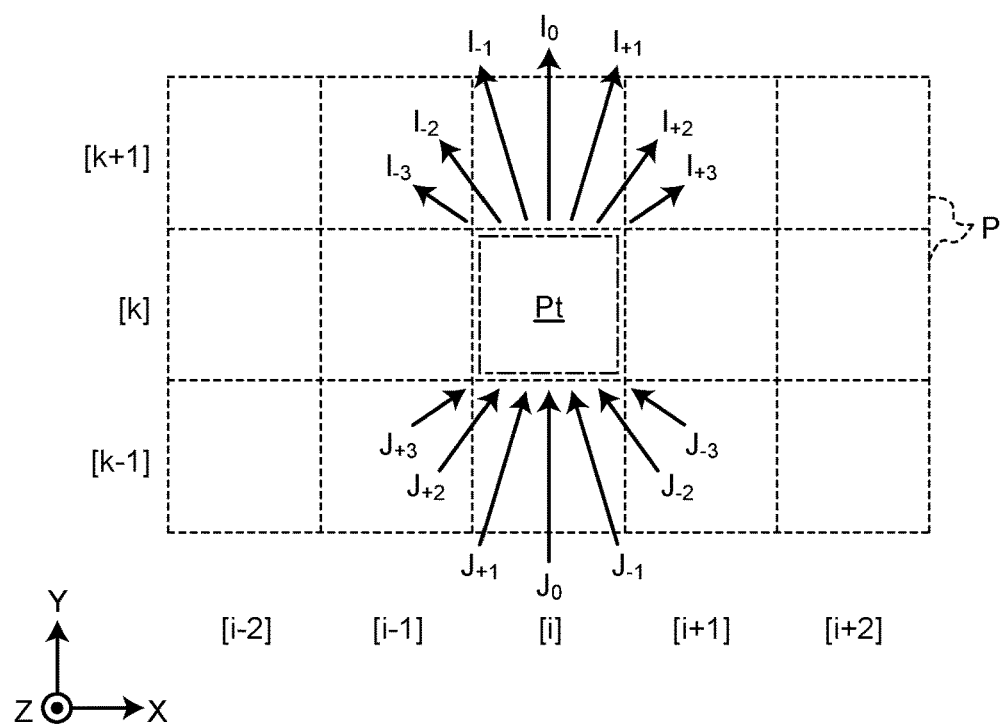
FIG. 9 is a schematic diagram of the display region in a plan view, illustrating light of the light source incident on one pixel and light of the light source emitted from the one pixel.

FIG. 9 is a schematic diagram of the display region DA in a plan view, illustrating light of the light sources SL incident on one pixel P and light of the light sources SL emitted from the one pixel P. As described above, light of the light sources SL propagates in the display panel 10 from the first side surface 10c toward the second side surface 10d. Specifically, light of the light sources SL passes through each of the pixels P from the −Y side toward the +Y side.

Light of the light sources SL propagates in the display panel 10 along the Y direction (corresponding to the first direction) and a direction (corresponding to a second direction) tilted relative to the Y direction in a plan view. Thus, light of the light sources SL is incident on pixels P from the −Y side thereof, along the Y direction and the direction tilted relative to the Y direction in a plan view. Light of the light sources SL incident on one pixel P is expressed as seven incident light rays $J_n$ (n is seven integers of −3 to +3) in a plan view. Hereinafter, when a positive direction is defined to be the clockwise direction with respect to the Y direction in a plan view, the angle between the Y direction and a direction in which light travels is referred to as a tilt angle.

The tilt angle of the incident light ray $J_0$ is 0°. In other words, the incident light ray $J_0$ travels along the Y direction. The tilt angle of the incident light ray $J_{+1}$ is +10°. The tilt angle of the incident light ray $J_{+2}$ is +20°. The tilt angle of the incident light ray $J_{+3}$ is +30°.

The tilt angle of the incident light ray $J_{-1}$ is −10°. The tilt angle of the incident light ray $J_{-2}$ is −20°. The tilt angle of the incident light ray $J_{-3}$ is −30°. The traveling direction of each of the incident light rays $J_{-1}$, $J_{-2}$, $J_{-3}$, $J_{+1}$, $J_{+2}$, and $J_{+3}$ tilted relative to the Y direction corresponds to the second direction.

Light of the light sources SL emitted from one pixel P is expressed as seven emission light rays $I_n$ (n is seven integers of −3 to +3) in a plan view.

The emission light ray $I_0$ is parallel to the incident light ray $J_0$. The tilt angle of the emission light ray $I_0$ is 0°. The emission light ray $I_{+1}$ is parallel to the incident light ray $J_{+1}$, and the tilt angle of the emission light ray $I_{+1}$ is +10°. The emission light ray $I_{+2}$ is parallel to the incident light ray $J_{+2}$, and the tilt angle of the emission light ray $I_{+2}$ is +20°. The emission light ray $I_{+3}$ is parallel to the incident light ray $J_{+3}$, and the tilt angle of the emission light ray $I_{+3}$ is +30°.

The emission light ray $I_{-1}$ is parallel to the incident light ray $J_{-1}$, and the tilt angle of the emission light ray $I_{-1}$ is −10°. The emission light ray $I_{-2}$ is parallel to the incident light ray $J_{-2}$, and the tilt angle of the emission light ray $I_{-2}$ is −20°. The emission light ray $I_{-3}$ is parallel to the incident light ray $J_{-3}$, and the tilt angle of the emission light ray $I_{-3}$ is −30°.

The index n in the reference signs of the incident light rays $J_n$ and the emission light rays $I_n$ corresponds to the tilt angle. Specifically, the tilt angle in the case of n=−3 is −30°, the tilt angle in the case of n=−2 is −20°, the tilt angle in the case of n=−1 is −10°, and the tilt angle in the case of n=0 is 0°. The tilt angle in the case of n=+1 is +10°, the tilt angle in the case of n=+2 is +20°, and the tilt angle in the case of n=+3 is +30°.

The first drive circuit 30 calculates output gradation values by using the above-described input gradation values and the amount of light of the light sources SL (in other words, the amount of light of the light source device 20) incident on pixels P along the Y direction (first direction) and the direction (second direction) tilted relative to the Y direction.

Figure 10:
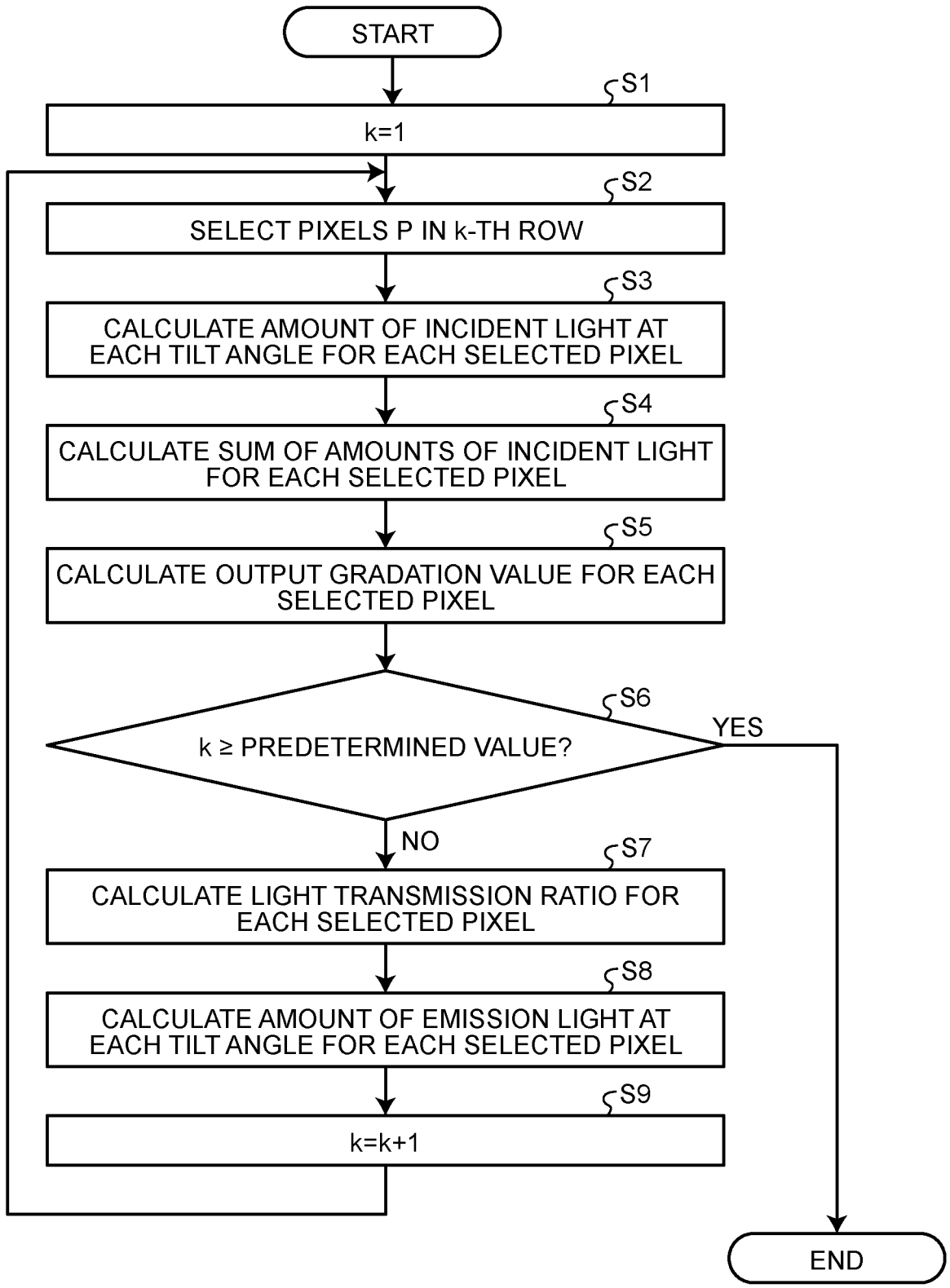
FIG. 10 is a flowchart of processing executed when the first drive circuit calculates output gradation values.

FIG. 10 is a flowchart of processing executed when the first drive circuit 30 calculates output gradation values. Upon acquisition of input gradation values (refer to FIG. 8), the first drive circuit 30 starts processing of a program of FIG. 10. The first drive circuit 30 sets k=1 at step S1. In other words, the first drive circuit 30 sets the row number (k) to 1.

Subsequently at step S2, the first drive circuit 30 selects the pixels P in the k-th row. In the case of k=1, the first drive circuit 30 selects the pixels P in the first row.

At step S3, the first drive circuit 30 calculates the amount (light amount) of the incident light ray $J_n$ at each tilt angle for each pixel P. The amounts of the incident light rays $J_n$ incident on each pixel P in the first row (k=1) (light amounts for one pixel P in the first row) illustrated in FIG. 8 are determined by the amount of light of the light sources SL and the arrangement of a plurality of the light sources SL, and specifically, are stored in a first table illustrated in Table 1. The first table is stored in a storage (storage circuit), which is not illustrated, of the first drive circuit 30.

TABLE 1

| $J_n$ | $J_{-3}$ | $J_{-2}$ | $J_{-1}$ | $J_0$ | $J_{+1}$ | $J_{+2}$ | $J_{+3}$ |
|---|---|---|---|---|---|---|---|
| Amount of incident light ray | 0.057 | 0.129 | 0.1995 | 0.229 | 0.1995 | 0.129 | 0.057 |

The amounts of the incident light rays $J_n$ at each pixel P in the first row are equal to one another. The amounts of the incident light rays $J_n$, may be different from one another among the pixels P in the first row. The sum of the amounts of the incident light rays $J_n$ of one pixel P among the pixels P in the first row in Table 1 corresponds to a first light amount (corresponding to a "first incident light amount"). The first light amount is a light amount with which desired luminance can be obtained at the pixel P. The first light amount is 1 in the present embodiment. The amount of light emitted from the light source device 20 corresponding to the first light amount corresponds to a "first emission light amount".

In the present embodiment, the maximum value of gradation values (input gradation values and output gradation values) is 1 as described above, which is equal to the value of the first light amount. Thus, equality between the luminance of a pixel P and the input gradation value of the pixel P means that desired luminance is obtained at the pixel P. For example, assume that the amount of light incident on the pixel P is the first light amount (in the present embodiment, 1 as described above) and the input gradation value is 0.8. In this case, when the luminance of the pixel P is 0.8, the luminance of the pixel P is equal to the input gradation value of the pixel P, and thus desired luminance is obtained at the pixel P.

At step S3, the first drive circuit 30 acquires the values stored in the first table and sets the amounts of the incident light rays $J_n$ for each pixel P in the first row to values obtained by multiplying the acquired values by an adjustment coefficient. Details of the adjustment coefficient will be described later. The adjustment coefficient is larger than 1 and is 1.6 in the present embodiment.

Specifically, at each pixel P in the first row, the amount of the incident light ray $J_{-3}$ is 0.0912 (=0.057×1.6), the amount of the incident light ray $J_{-2}$ is 0.2064 (=0.129×1.6), the amount of the incident light ray $J_{-1}$ is 0.3192 (=0.1995×1.6), the amount of the incident light ray $J_0$ is 0.3664 (=0.229× 1.6), the amount of the incident light ray $J_{+1}$ is 0.3192 (=0.1995×1.6), the amount of the incident light ray $J_{+2}$ is 0.2064 (=0.129×1.6), and the amount of the incident light ray $J_{+3}$ is 0.0912 (=0.057×1.6).

Subsequently at step S4, the first drive circuit 30 calculates the sum of the amounts of the incident light rays $J_n$ for each selected pixel P. Specifically, the first drive circuit 30 sums the amounts of the incident light rays $J_{-3}$, $J_{-2}$, $J_{-1}$, $J_0$, $J_{+1}$, $J_{+2}$, and $J_{+3}$ for each pixel P in the first row. The sum of the incident light rays $J_n$ is 1.6 (=0.0912+0.2064+0.3192+ 0.3664+0.3192+0.2064+0.0912).

Figure 11:
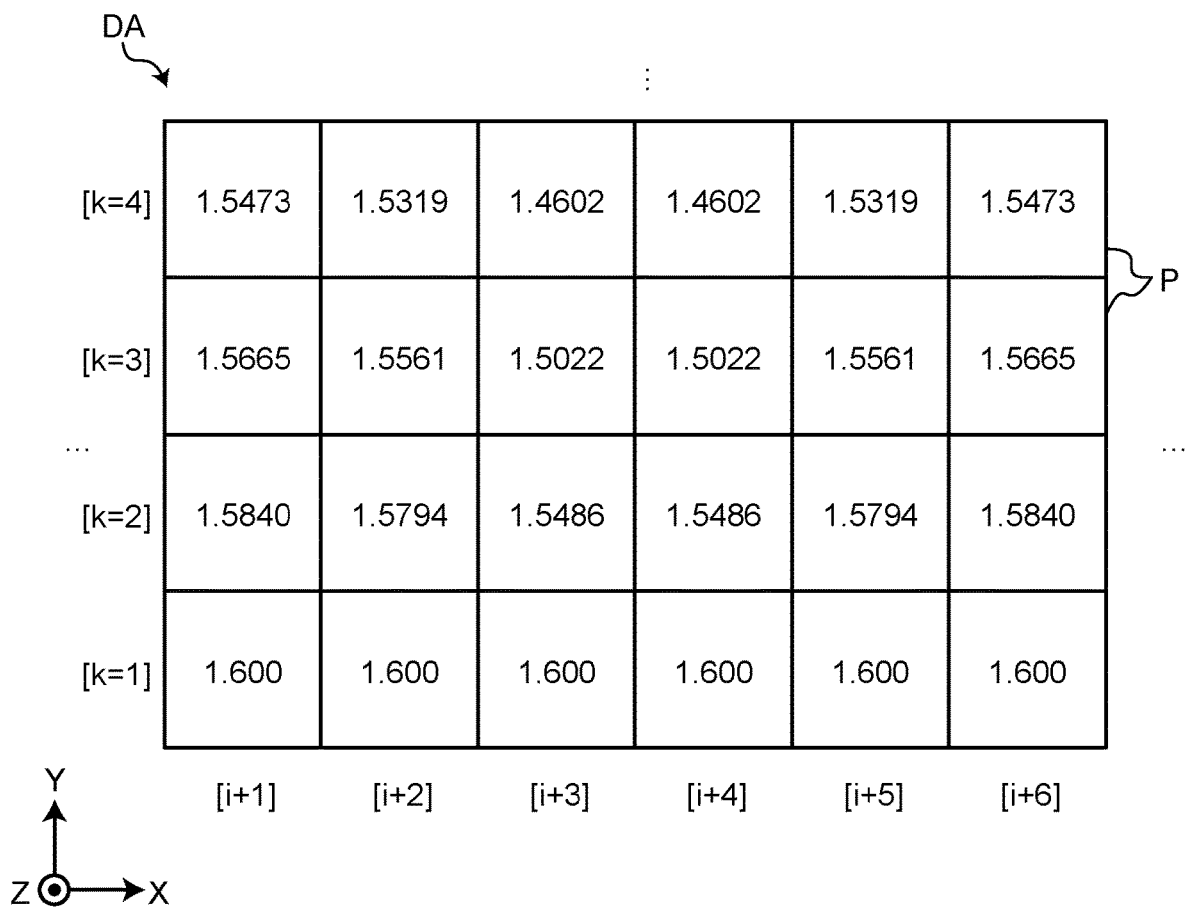
FIG. 11 is a diagram illustrating the sum of the amounts of incident light rays at each of a plurality of pixels.

FIG. 11 is a diagram illustrating the sum of the amounts of the incident light rays $J_n$ at each of the pixels P. Similarly to FIG. 8, FIG. 11 illustrates some of the pixels P. In FIG. 11, the value illustrated in each pixel P indicates the sum of the amounts of the incident light rays $J_n$. The sum of the amounts of the incident light rays $J_n$ of each of the pixels P in the first row (k=1) is 1.6.

As described above, when the first drive circuit 30 calculates output gradation values by using the adjustment coefficient, the sum of the amounts of the incident light rays $J_n$ at one pixel P among the pixels P in the first row is a second light amount (1.6 (=the first light amount (1)×the adjustment coefficient (1.6)): corresponding to a "second incident light amount") larger than the first light amount (1). This means that the amount of light of the light sources SL when the first drive circuit 30 calculates output gradation values by using the adjustment coefficient is larger than the amount of light of the light sources SL when the first drive circuit 30 calculates output gradation values without using the adjustment coefficient. In other words, this does not mean that the first light amount corresponds to the maximum luminance of the light sources SL. The light sources SL are driven at the maximum luminance or lower (for example, about 50% to 85% of the maximum luminance) in a normal use state, and the luminance thereof can be increased to the maximum luminance. For example, in a case in which the first light amount corresponds to 50% of the maximum luminance of the light sources SL, the second light amount corresponds to about 80% (=50%×1.6) of the maximum luminance of the light sources. The adjustment coefficient is changeable as appropriate. In the present embodiment, the amount of light of the light source device 20 is adjusted to a light amount corresponding to the second light amount (corresponding to a "second emission light amount").

At step S5, the first drive circuit 30 calculates an output gradation value for each selected pixel P. Specifically, the first drive circuit 30 uses the input gradation values in FIG. 8 and the sums of the amounts of the incident light rays $J_n$ in FIG. 11 and calculates an output gradation value (=input gradation value/sum of the amounts of the incident light rays $J_n$) for each pixel P in the first row by dividing the input gradation value by the sum of the amounts of the incident light rays $J_n$.

Figure 12:
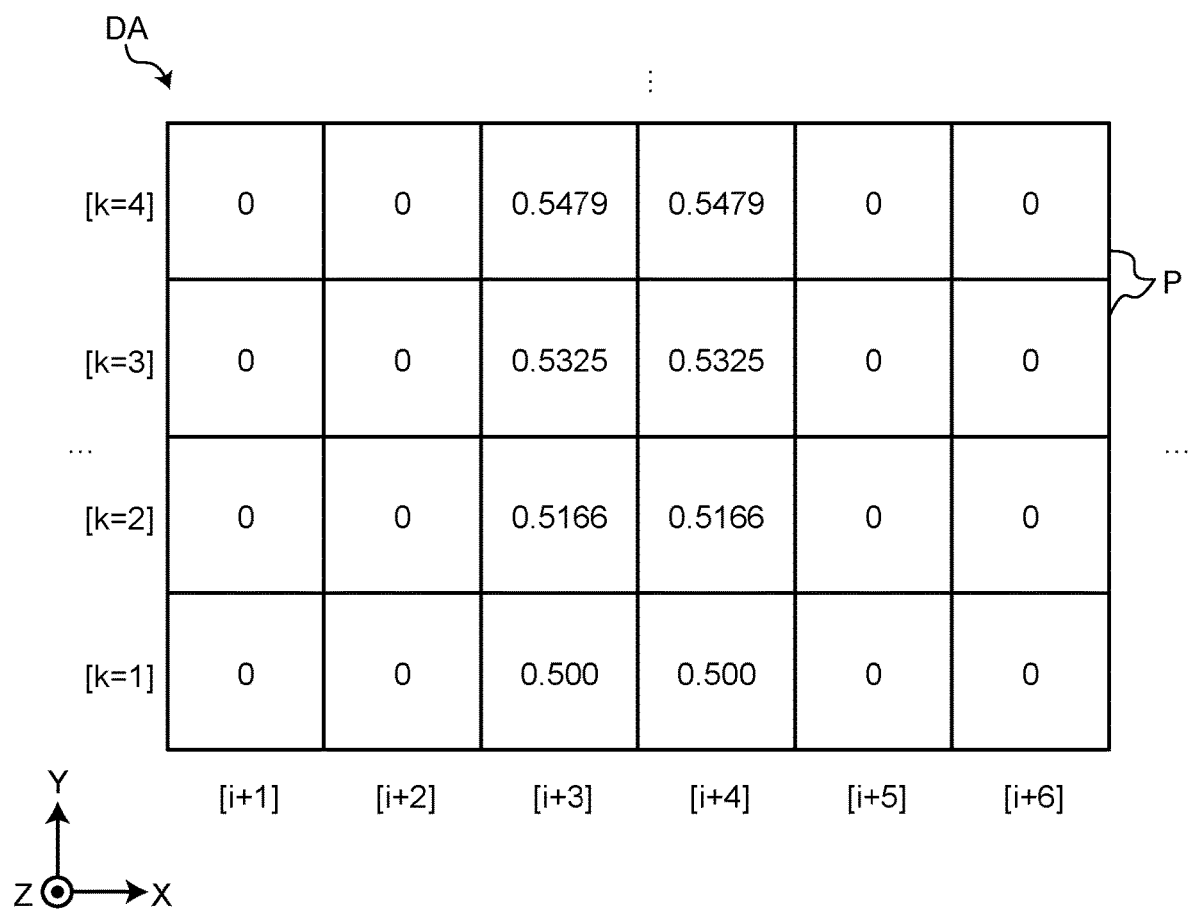
FIG. 12 is a diagram illustrating output gradation values of the pixels.

FIG. 12 is a diagram illustrating output gradation values of the pixels P. Similarly to FIGS. 8 and 11, FIG. 12 illustrates some of the pixels P. In FIG. 12, the value illustrated in each pixel P indicates a definitive output gradation value (or adjusted output gradation value). The output gradation values of the pixels P in the (i+3)-th and (i+4)-th columns are different among the rows, but the luminance is equalized among the pixels P as described later and appears the same thereamong for a user. In other words, luminance is equalized among the pixels P and the output gradation values are adjusted to provide the same luminance when viewed from the user.

Specifically, among the pixels P in the first row, the output gradation values of the pixels P(1, i+1), P(1, i+2), P(1, i+5), and P(1, i+6) are 0 (=0/1.6). The output gradation values of the pixels P(1, i+3) and P(1, i+4) are 0.5000 (=0.8/1.6).

Subsequently at step S6, the first drive circuit 30 determines whether k is equal to or larger than the predetermined value. The predetermined value is the maximum value (for example, 1080) of the number of rows of pixels P as described above. When k is equal to or larger than the predetermined value (Yes at step S6), the output gradation values of all pixels P have been calculated and the first drive circuit 30 ends the program.

In the case of k=1, k is smaller than the predetermined value. In this case (No at step S6), the first drive circuit 30 calculates a light transmission ratio for each selected pixel P at step S7. First, the first drive circuit 30 calculates a first decrease ratio (the degree of first light scattering) and a second decrease ratio (the degree of second light scattering) described below.

Light propagating through a pixel P is consumed by bouncing off and being scattered by elements such as the signal lines Lb, the pixel electrodes PE, and the switching elements SW included in the display panel 10 as described above. In addition, light propagating through a pixel P is consumed by being absorbed by metal parts such as the switching elements SW and a glass part such as the first substrate 11. Based on these facts, it is determined that the first decrease ratio corresponds to the ratio of decrease of light when propagating through a pixel P irrespective of display and position of the pixel P. In other words, the first decrease ratio is determined by the structure of the pixel P but is constant irrespective of the position of the pixel P. In the present embodiment, the first decrease ratio is set to a first predetermined ratio (specifically, 1%) and equal among a plurality of pixels P. Specifically, the first decrease ratio of each pixel P in the first row is 0.01 (1%).

When a pixel P is in a display state, in other words, the liquid crystal layer 13 at the pixel P is in the scattering state, light propagating through the pixel P is scattered by the liquid crystal layer 13 and consumed. Thus, the second decrease ratio corresponds to the ratio of decrease of light propagating through one pixel P caused by the scattering state of the liquid crystal layer 13 corresponding to the one pixel P. The second decrease ratio changes in accordance with the degree of the scattering state of the liquid crystal layer 13, in other words, the corresponding output gradation value. Specifically, the second decrease ratio becomes larger as the scattering degree of the liquid crystal layer 13 at one pixel P is larger, in other words, as the corresponding output gradation value is larger. In the present embodiment, the first drive circuit 30 calculates the second decrease ratio by multiplying the output gradation value (FIG. 12) corresponding to one pixel P by a second predetermined ratio (specifically, 5%). Thus, the second decrease ratio increases in accordance with the output gradation value. The second predetermined ratio is constant irrespective of the position of the pixel P.

Specifically, the second decrease ratios of the pixels P(1, i+1), P(1, i+2), P(1, i+5), and P(1, i+6) in the first row are 0 (=0×0.05 (5%)). In other words, a region of the liquid crystal layer 13 corresponding to those pixels P that have the output gradation values of 0 and where display is not performed, is in the transmitting state. Thus no light scattering occurs in the region of the liquid crystal layer 13, and the second decrease ratios are 0. On the other hand, the second decrease ratios of the pixels P(1, i+3) and P(1, i+4) are 0.025 (=0.5000×0.05 (5%)). In other words, a region of the liquid crystal layer 13 corresponding to the pixels P that have the output gradation values of 0.5 and where display is performed, is in the scattering state. Thus light scattering occurs in the region of the liquid crystal layer 13, and the second decrease ratios are larger than 0. The first predetermined ratio and the second predetermined ratio are derived by experiment or the like in advance and stored in the storage of the first drive circuit 30. The first predetermined ratio and the second predetermined ratio are not limited to the above-described values.

The first drive circuit 30 calculates the transmission ratio by subtracting the first decrease ratio and the second decrease ratio from 1. Specifically, the transmission ratios of the pixels P(1, i+1), P(1, i+2), P(1, i+5), and P(1, i+6) in the first row are 0.99 (=1-0.01-0). The transmission ratios of the pixels P(1, i+3) and P(1, i+4) are 0.965 (=1-0.01-0.025).

At step S8, the first drive circuit 30 calculates the amount of the emission light ray $I_n$ at each tilt angle for each selected pixel P. In the present embodiment, as described above, it is assumed that light passing through one pixel P propagates in seven directions (directions in which the tilt angle is −30°, −20°, −10°, 0°, +10°, +20°, and +30°). The following description is separately made for each direction (each tilt angle).

FIG. 13 is a diagram illustrating the amount of the incident light ray $J_0$ and the amount of the emission light ray $I_0$ at each pixel P in the first row and the amount of the incident light ray $J_0$ at each pixel P in the second row in a case in which the tilt angle is 0° (n=0). The amount of the incident light ray $J_0$ at each of the pixels P(1, i+1), P(1, i+2), P(1, i+3), P(1, i+4), P(1, i+5), and P(1, i+6) in the first row is calculated at step S3 described above and is 0.3664.

The first drive circuit 30 multiplies the amount of the incident light ray $J_0$ by the above-described transmission ratio, thereby calculating the amount of the emission light ray $I_0$ for each pixel P in the first row. Specifically, the amount of the emission light ray $I_0$ of each of the pixels P(1, i+1), P(1, i+2), P(1, i+5), and P(1, i+6) is 0.3627 (=0.3664× 0.99). The amount of the emission light ray $I_0$ of each of the pixels P(1, i+3) and P(1, i+4) is 0.3536 (=0.3664×0.965).

FIG. 14 is a diagram illustrating the amount of the incident light ray $J_{+1}$ and the amount of the emission light ray $I_{+1}$ at each pixel P in the first row and the amount of the incident light ray $J_{+1}$ at each pixel P in the second row in a case in which the tilt angle is +10° (n=+1). In this example, it is assumed that light propagating to such a pixel P propagates with its traveling direction maintained, in other words, propagates straight. Specifically, it is assumed that light (the incident light ray $J_{+1}$) incident on such a pixel P at +10° constitutes light (the emission light ray $I_{+1}$) leaving the pixel P at +10°. This is the same in description of the other light rays having tilt angles described below. The amount of the incident light ray $J_{+1}$ at each of the pixels P(1, i+1), P(1, i+2), P(1, i+3), P(1, i+4), P(1, i+5), and P(1, i+6) in the first row is calculated at step S3 described above and is 0.3192.

The first drive circuit 30 multiplies the amount of the incident light ray $J_{+1}$ by the above-described transmission ratio, thereby calculating the amount of the emission light ray $I_{+1}$ for each pixel P in the first row. Specifically, the amount of the emission light ray $I_{+1}$ of each of the pixels P(1, i+1), P(1, i+2), P(1, i+5), and P(1, i+6) is 0.3160 (=0.3192× 0.99). The amount of the emission light ray $I_{+1}$ of each of the pixels P(1, i+3) and P(1, i+4) is 0.3080 (=0.3192×0.965).

FIG. 15 is a diagram illustrating the amount of the incident light ray $J_{-1}$ and the amount of the emission light ray $I_{-1}$ at each pixel P in the first row and the amount of the incident light ray $J_{-1}$ at each pixel P in the second row in a case in which the tilt angle is −10° (n=−1). The amount of the incident light ray $J_{-1}$ at each of the pixels P(1, i+1), P(1, i+2), P(1, i+3), P(1, i+4), P(1, i+5), and P(1, i+6) in the first row is calculated at step S3 described above and is 0.3192.

The first drive circuit 30 multiplies the amount of the incident light ray $J_{-1}$ by the above-described transmission ratio, thereby calculating the amount of the emission light ray $I_{-1}$ for each pixel P in the first row. Specifically, the amount of the emission light ray $I_{-1}$ of each of the pixels P(1, i+1), P(1, i+2), P(1, i+5), and P(1, i+6) is 0.3160 (=0.3192× 0.99). The amount of the emission light ray $I_{-1}$ of each of the pixels P(1, i+3) and P(1, i+4) is 0.3080 (=0.3192×0.965).

FIG. 16 is a diagram illustrating the amount of the incident light ray $J_{+2}$ and the amount of the emission light ray $I_{+2}$ at each pixel P in the first row and the amount of the incident light ray $J_{+2}$ at each pixel P in the second row in a case in which the tilt angle is +20° (n=+2). The amount of the incident light ray $J_{+2}$ at each of the pixels P(1, i+1), P(1, i+2), P(1, i+3), P(1, i+4), P(1, i+5), and P(1, i+6) in the first row is calculated at step S3 described above and is 0.2064.

The first drive circuit 30 multiplies the amount of the incident light ray $J_{+2}$ by the above-described transmission ratio, thereby calculating the amount of the emission light ray $I_{+2}$ for each pixel P in the first row. Specifically, the amount of the emission light ray $I_{+2}$ of each of the pixels P(1, i+1), P(1, i+2), P(1, i+5), and P(1, i+6) is 0.2043 (=0.2064× 0.99). The amount of the emission light ray $I_{+2}$ of each of the pixels P(1, i+3) and P(1, i+4) is 0.1992 (=0.2064×0.965).

FIG. 17 is a diagram illustrating the amount of the incident light ray $J_{-2}$ and the amount of the emission light ray $I_{-2}$ at each pixel P in the first row and the amount of the incident light ray $J_{-2}$ at each pixel P in the second row in a case in which the tilt angle is −20° (n=−2). The amount of the incident light ray $J_{-2}$ at each of the pixels P(1, i+1), P(1, i+2), P(1, i+3), P(1, i+4), P(1, i+5), and P(1, i+6) in the first row is calculated at step S3 described above and is 0.2064.

The first drive circuit 30 multiplies the amount of the incident light ray $J_{-2}$ by the above-described transmission ratio, thereby calculating the amount of the emission light ray $I_{-2}$ for each pixel P in the first row. Specifically, the amount of the emission light ray $I_{-2}$ of each of the pixels P(1, i+1), P(1, i+2), P(1, i+5), and P(1, i+6) is 0.2043 (=0.2064× 0.99). The amount of the emission light ray $I_{-2}$ of each of the pixels P(1, i+3) and P(1, i+4) is 0.1992 (=0.2064×0.965).

FIG. 18 is a diagram illustrating the amount of the incident light ray $J_{+3}$ and the amount of the emission light ray $I_{+3}$ at each pixel P in the first row and the amount of the incident light ray $J_{+3}$ at each pixel P in the second row in a case in which the tilt angle is +30° (n=+3). The amount of the incident light ray $J_{+3}$ at each of the pixels P(1, i+1), P(1, i+2), P(1, i+3), P(1, i+4), P(1, i+5), and P(1, i+6) in the first row is calculated at step S3 described above and is 0.0912.

The first drive circuit 30 multiplies the amount of the incident light ray $J_{+3}$ by the above-described transmission ratio, thereby calculating the amount of the emission light ray $I_{+3}$ for each pixel P in the first row. Specifically, the amount of the emission light ray $I_{+3}$ of each of the pixels P(1, i+1), P(1, i+2), P(1, i+5), and P(1, i+6) is 0.0903 (=0.0912× 0.99). The amount of the emission light ray $I_{+3}$ of each of the pixels P(1, i+3) and P(1, i+4) is 0.0880 (=0.0912×0.965).

FIG. 19 is a diagram illustrating the amount of the incident light ray $J_{-3}$ and the amount of the emission light ray $I_{-3}$ at each pixel P in the first row and the amount of the incident light ray $J_{-3}$ at each pixel P in the second row in a case in which the tilt angle is −30° (n=−3). The amount of the incident light ray $J_{-3}$ at each of the pixels P(1, i+1), P(1, i+2), P(1, i+3), P(1, i+4), P(1, i+5), and P(1, i+6) in the first row is calculated at step S3 described above and is 0.0912.

The first drive circuit 30 multiplies the amount of the incident light ray $J_{-3}$ by the above-described transmission ratio, thereby calculating the amount of the emission light ray $I_{-3}$ for each pixel P in the first row. Specifically, the amount of the emission light ray $I_{-3}$ of each of the pixels P(1, i+1), P(1, i+2), P(1, i+5), and P(1, i+6) is 0.0903 (=0.0912× 0.99). The amount of the emission light ray $I_{-3}$ of each of the pixels P(1, i+3) and P(1, i+4) is 0.0880 (=0.0912×0.965).

As described above, the first drive circuit 30 calculates, for each pixel P in the first row, the amounts of the incident light rays $J_n$, the output gradation value, and the amounts of the emission light rays $I_n$.

Subsequently at step S9, the first drive circuit 30 adds 1 to k (in other words, sets k=k+1). In the case of k=1, the first drive circuit 30 sets k=2 (=1+1). Then, the first drive circuit 30 returns the program to step S2.

At step S2, the first drive circuit 30 selects the pixels P in the k-th row. In the case of k=2, the first drive circuit 30 selects the pixels P in the second row.

At step S3, the first drive circuit 30 calculates the amount of the incident light ray $J_n$ at each tilt angle for each selected pixel P. The amounts of the incident light rays $J_n$ incident on each pixel P in the second row and the subsequent rows are determined based on the amounts of the emission light rays $I_n$ in the (k−1)-th row and calculated by a different method for each tilt angle.

Specifically, the emission light ray $I_0$ that is the emission light ray $I_n$ having a tilt angle of 0° (n=0) travels along the Y direction, and the emission light ray $I_0$ of each pixel P in the (k−1)-th row is incident only on a pixel P in the k-th row having the same column number and adjacent to the pixel P in the (k−1)-th row on the +Y side thereof, along the Y direction.

Among the emission light rays $I_n$ having tilt angles different from 0°, the emission light rays $I_{+1}, I_{+2}, I_{+3}, I_{-1}, I_{-2}$, and $I_{-3}$ of each of the pixels P in the (k−1)-th row are each incident on two pixels P among the pixels P in the k-th row.

Figure 20:
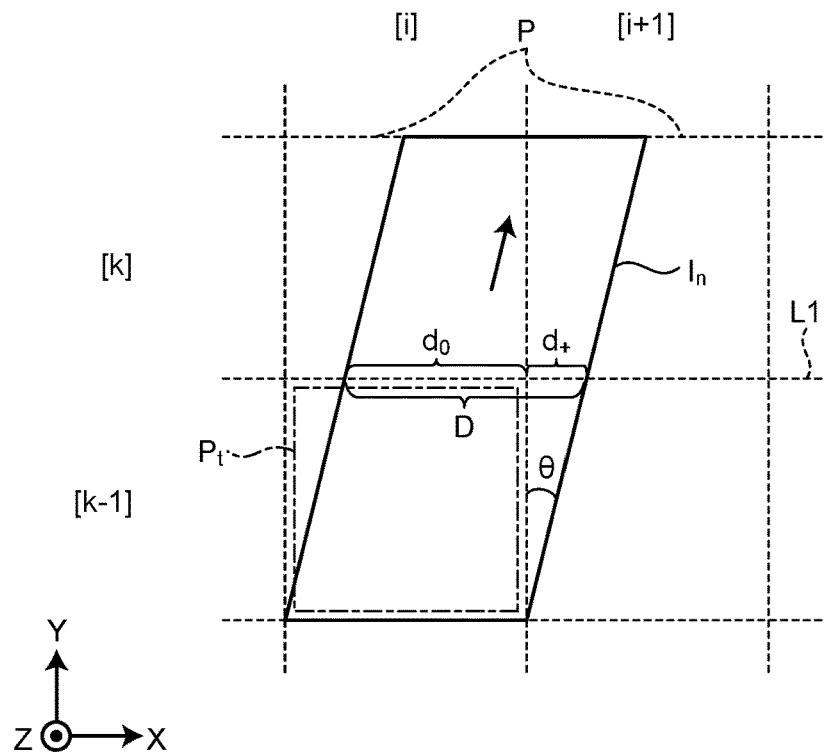
FIG. 20 is a diagram illustrating a pixel on which emission light rays tilted in a positive (+) direction relative to a Y direction are incident.

FIG. 20 is a diagram illustrating a pixel P on which the emission light rays $I_{+1}, I_{+2}$, and $I_{+3}$ tilted in a positive (+) direction relative to the Y direction are incident. The pixel P has a square shape as described above, and the length of one side of the pixel P is 1. The angle θ is the tilt angle.

The emission light ray $I_n$ (n=+1, +2, +3) of a pixel Pt (specifically, the pixel P(k−1, i)) is incident on the pixel P(k, i) and the pixel P(k, i+1) next thereto. In this case, the amount of the emission light ray $I_n$ is distributed to the pixel P(k, i) and the pixel P(k, i+1) in accordance with a distribution ratio $r_0$ and a distribution ratio r+.

Specifically, when it is assumed that the emission light ray $I_n$ has a width equal to a pixel width (the length of one side of each pixel P, which is 1), the ratio of a length $d_0$ of a part corresponding to the pixel P(k, i) relative to a length D of a part at which the emission light ray $I_n$ overlaps a partition line L1 corresponds to the distribution ratio $r_0$ (=$d_0$/D). The partition line L1 is a line partitioning the pixels P in the (k−1)-th row from the pixels P in the k-th row. The ratio of a length $d_+$ of a part corresponding to the pixel P(k, i+1) relative to the length D of the part at which the partition line L1 and the emission light ray $I_n$ overlap each other corresponds to the distribution ratio $r_+$ (=$d_+$/D). It is clear that $d_0+d_+=D$.

Figure 21:
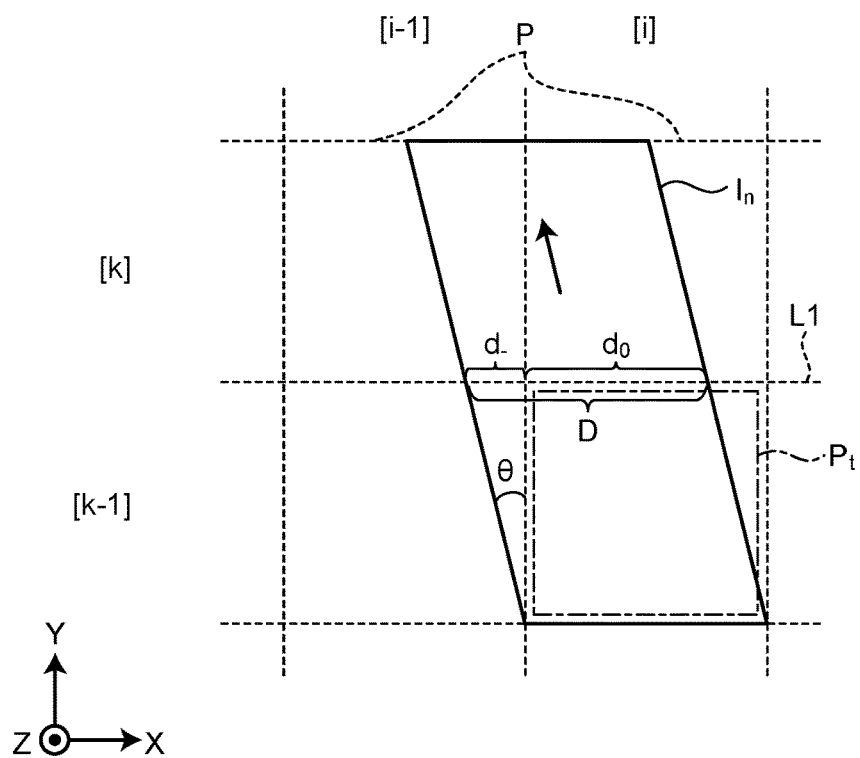
FIG. 21 is a diagram illustrating a pixel P on which emission light rays tilted in a negative (−) direction relative to the Y direction are incident.

FIG. 21 is a diagram illustrating a pixel P on which the emission light rays $I_{-1}, I_{-2}$, and $I_{-3}$ tilted on a negative (−) direction relative to the Y direction are incident.

The emission light ray $I_n$ (n=−1, −2, −3) of a pixel Pt is incident on the pixel P(k, i) and the pixel P(k, i−1) next thereto. In this case, the amount of the emission light ray $I_n$ is distributed to the pixel P(k, i) and the pixel P(k, i−1) in accordance with the distribution ratio $r_0$ and a distribution ratio $r_-$.

Specifically, when it is assumed that the emission light ray $I_n$ has a width equal to the pixel width, the ratio of a length $d_0$ of a part corresponding to the pixel P(k, i) relative to a length D of a part at which the emission light ray $I_n$ overlaps a partition line L1 corresponds to the distribution ratio $r_0$ (=$d_0$/D). The partition line L1 is a line partitioning the pixels P in the (k−1)-th row from the pixels P in the k-th row. The ratio of a length $d_-$ of a part corresponding to the pixel P(k, i−1) relative to the length D of the part at which the partition line L1 and the emission light ray $I_n$ Overlap each other corresponds to the distribution ratio $r_-$ (=$d_-$/D). It is clear that $d_0+d_-=D$.

The values of the distribution ratios $r_-, r_0$, and $r_+$ are stored in a second table illustrated in Table 2. The second table is stored in the storage of the first drive circuit 30. The values of the distribution ratios $r_-, r_0$, and $r_+$ change in accordance with the magnitude of the tilt angle. Specifically, the values of the distribution ratios $r_-$ and $r_+$ correspond to the value of tan θ, and the value of the distribution ratio $r_0$ is a value obtained by subtracting the distribution ratios $r_-$ or $r_+$ from D. For example, in the case of n=+1 (θ=10°), the distribution ratio $r_+$ is 0.176 (=)tan 10°, and the distribution ratio $r_0$ is 0.824 (=D (=1)−$r_+$ (=0.176)). In a case in which the tilt angle is 0 (n=0), the emission light ray $I_0$ is not distributed as described above, and the distribution ratio $r_0$ is 1. The letter "N" in the second table indicates that no value exists.

TABLE 2

| n | −3 | −2 | −1 | 0 | +1 | +2 | +3 |
|---|---|---|---|---|---|---|---|
| θ | −30° | −20° | −10° | 0° | 10° | 20° | 30° |
| $r_0$ | 0.423 | 0.636 | 0.824 | 1 | 0.824 | 0.636 | 0.423 |
| $r_+$ | N | N | N | N | 0.176 | 0.364 | 0.577 |
| $r_-$ | 0.577 | 0.364 | 0.176 | N | N | N | N |

The pixel Pt illustrated in FIGS. 20 and 21 corresponds to a "first pixel", the pixel P(k, i) corresponds to a "second pixel", and the pixel P(k, i+1) and the pixel P(k, i−1) correspond to a "third pixel". As described above, the emission light rays $I_n$ (light of the light sources SL (light source device 20)) emitted from the pixel Pt as a first pixel among the pixels P and along the direction (second direction) tilted relative to the Y direction are incident on the pixel P(k, i) as the second pixel adjacent to the pixel Pt along the Y direction (first direction) and on one of the pixel P(k, i+1)

and incident on the pixel P(k, i−1) as the third pixel adjacent to the pixel P(k, i) along the X direction (third direction). As described later, the amounts of the emission light rays $I_n$ (the amount of light of the light sources SL (light source device 20)) emitted from the pixel Pt as the first pixel are distributed, in accordance with the tilt angle of the direction (second direction) relative to the Y direction (first direction), to the amounts of the incident light rays $J_n$ (the amount of light of the light sources SL (light source device 20)) incident on the pixel P(k, i) as the second pixel and the amounts of the incident light rays $J_n$ incident on one of the pixel P(k, i+1) and the pixel P(k, i−1) as the third pixel.

In the case of k≥ 2, at step S3, the first drive circuit 30 calculates the amount of the incident light ray $J_n$ at each tilt angle for each pixel P in the k-th row by using the amounts of the emission light rays $I_n$ in the (k−1)-th row and the second table. Specifically, in the case of k=2, the first drive circuit 30 calculates the amount of the incident light ray $J_n$ at each tilt angle for each pixel P in the second row by using the amounts of the emission light rays $I_n$ in the first row (k=1) and the second table.

In a case in which the tilt angle is 0° (n=0), the emission light ray $I_0$ of one pixel P (P1) is incident only on one pixel P (P2) adjacent to the pixel P1 on the +Y side of the pixel P1. For example, the emission light ray $I_0$ of the pixel P(1, i+2) is incident on the pixel P(2, i+2).

Thus, in a case in which the tilt angle is 0° (n=0), the first drive circuit 30 multiplies the amount of the emission light ray $I_0$ of each pixel P in the first row (k=1) illustrated in FIG. 13 by the distribution ratio $r_0$ (specifically, one) corresponding to n=0 in the second table, thereby calculating the amount of the incident light ray $J_0$ for each pixel P in the second row (k=2).

Specifically, as illustrated in FIG. 13, the amount of the incident light ray $J_0$ of each of the pixels P(2, i+1), P(2, i+2), P(2, i+5), and P(2, i+6) among the pixels P in the second row (k=2) is 0.3627 (=0.3627×1). The amount of the incident light ray $J_0$ of each of the pixels P(2, i+3) and P(2, i+4) is 0.3536 (=0.3536×1).

In a case in which the tilt angle is +10° (n=+1), the emission light ray $I_{+1}$ of one pixel P (P1) is incident on one pixel P (P2) adjacent to the pixel P1 on the +Y side of the pixel P1 and a pixel P (P3) adjacent to the pixel P2 on the +X side of the pixel P2 adjacent to the pixel P1 on the +Y side of the pixel P1. For example, the emission light ray $I_{+1}$ of the pixel P(1, i+2) is incident on the pixels P(2, i+2) and P(2, i+3).

Thus, in a case in which the tilt angle is +10° (n=+1), the first drive circuit 30 multiplies the amount of the emission light ray $I_{+1}$ of each pixel P in the first row (k=1) illustrated in FIG. 14 by the distribution ratio $r_0$ (specifically, 0.824) and the distribution ratio $r_+$ (specifically, 0.176) corresponding to n=+1 in the second table, thereby distributing the amount of the emission light ray $I_{+1}$ of each pixel P in the first row (k=1).

Specifically, as illustrated in FIG. 14, the amount of the emission light ray $I_{+1}$ of each of the pixels P(1, i+1), P(1, i+2), P(1, i+5), and P(1, i+6) is distributed as an amount of 0.2604 (=0.3160×0.824) and an amount of 0.0556 (=0.3160×0.176). In other words, the amount of the emission light ray $I_{+1}$ of each of the pixels P(1, i+1), P(1, i+2), P(1, i+5), and P(1, i+6) is divided into an amount of 0.2604 (=0.3160×0.824) and an amount of 0.0556 (=0.3160×0.176). The amount of the emission light ray $I_{+1}$ of each of the pixels P(1, i+3) and P(1, i+4) is distributed as an amount of 0.2538 (=0.3080×0.824) and an amount of 0.0542 (=0.3080×0.176).

Subsequently, the first drive circuit 30 calculates the amount of the incident light ray $J_{+1}$ of each pixel P in the second row (k=2) in accordance with the distributed amounts of the emission light ray $I_{+1}$. Specifically, the incident light ray $J_{+1}$ of the pixel P(2, i+1) corresponds to combined light of light corresponding to the distribution ratio $r_0$ in the emission light ray $I_{+1}$ of the pixel P(1, i+1) and light corresponding to the distribution ratio $r_+$ in the emission light ray $I_{+1}$ of the pixel P(1, i+0) (not illustrated) adjacent to the pixel P(1, i+1) on the −X side thereof. The light amount corresponding to the distribution ratio $r_+$ in the amount of the emission light ray $I_{+1}$ of the pixel P(1, i+0) is 0.0556. Thus, the amount of the incident light ray $J_{+1}$ of the pixel P(2, i+1) is 0.3160 (=0.2604+0.0556). The dashed line arrow illustrated in FIG. 14 indicates that the light corresponding to the distribution ratio $r_+$ in the emission light ray $I_{+1}$ of the pixel P(1, i+0) is incident on the pixel P(2, i+1).

The incident light ray $J_{+1}$ of the pixel P(2, i+2) corresponds to combined light of light corresponding to the distribution ratio $r_0$ in the emission light ray $I_{+1}$ of the pixel P(1, i+2) and light corresponding to the distribution ratio $r_+$ in the emission light ray $I_{+1}$ of the pixel P(1, i+1). Thus, the amount of the incident light ray $J_{+1}$ of the pixel P(2, i+2) is 0.3160 (=0.2604+0.0556).

In addition, the first drive circuit 30 calculates the amount of the incident light ray $J_{+1}$ of each of the pixels P(2, i+3), P(2, i+4), P(2, i+5), and P(2, i+6) in the same manner as the above-described incident light ray $J_{+1}$ of the pixel P(2, i+2). Thus, the amount of the incident light ray $J_{+1}$ of the pixel P(2, i+3) is 0.3094 (=0.2538+0.0556), and the amount of the incident light ray $J_{+1}$ of the pixel P(2, i+4) is 0.3080 (=0.2538+0.0542). The amount of the incident light ray $J_{+1}$ of the pixel P(2, i+5) is 0.3146 (=0.2604+0.0542), and the amount of the incident light ray $J_{+1}$ of the pixel P(2, i+6) is 0.3160 (0.2604+0.0556).

In a case in which the tilt angle is −10° (n=−1), the emission light ray $I_{−1}$ of one pixel P (P1) is incident on one pixel P (P2) adjacent to the pixel P1 on the +Y side of the pixel P1 and a pixel P (P3) adjacent to the pixel P2 on the −X side of the pixel P2 adjacent to the pixel P1 on the +Y side of the pixel P1. For example, the emission light ray $I_{−1}$ of the pixel P(1, i+2) is incident on the pixels P(2, i+2) and P(2, i+1).

Thus, in a case in which the tilt angle is −10° (n=−1), the first drive circuit 30 multiplies the amount of the emission light ray $I_{−1}$ of each pixel P in the first row (k=1) illustrated in FIG. 15 by the distribution ratio $r_0$ (specifically, 0.824) and the distribution ratio $r_−$ (specifically, 0.176) corresponding to n=−1 in the second table, thereby distributing the amount of the emission light ray $I_{−1}$ of each pixel P in the first row (k=1).

Specifically, as illustrated in FIG. 15, the amount of the emission light ray $I_{−1}$ of each of the pixels P(1, i+1), P(1, i+2), P(1, i+5), and P(1, i+6) is distributed as an amount of 0.2604 (=0.3160×0.824) and an amount of 0.0556 (=0.3160×0.176). The amount of the emission light ray $I_{−1}$ of each of the pixels P(1, i+3) and P(1, i+4) is distributed as an amount of 0.2538 (=0.3080×0.824) and an amount of 0.0542 (=0.3080×0.176).

Subsequently, the first drive circuit 30 calculates the amount of the incident light ray $J_{−1}$ of each pixel P in the second row (k=2) based on the distributed amounts of the emission light ray $I_{−1}$. Specifically, the incident light ray $J_{−1}$ of the pixel P(2, i+6) corresponds to combined light of light corresponding to the distribution ratio $r_0$ in the emission light ray $I_{−1}$ of the pixel P(1, i+6) and light corresponding to the distribution ratio $r_−$ in the emission light ray $I_{−1}$ of the pixel P(1, i+7) (not illustrated) adjacent to the pixel P(1, i+6) on the +X side thereof. The light amount corresponding to the distribution ratio $r_-$ in the amount of the emission light ray $I_{-1}$ of the pixel P(1, i+7) is 0.0556. Thus, the amount of the incident light ray $J_{-1}$ of the pixel P(2, i+6) is 0.3160 (=0.2604+0.0556). The dashed line arrow illustrated in FIG. 15 indicates that the light corresponding to the distribution ratio $r_-$ in the emission light ray $I_{-1}$ of the pixel P(1, i+7) is incident on the pixel P(2, i+6).

The incident light ray $J_{-1}$ of the pixel P(2, i+1) corresponds to combined light of light corresponding to the distribution ratio $r_0$ in the emission light ray $I_{-1}$ of the pixel P(1, i+1) and light corresponding to the distribution ratio $r_-$ in the emission light ray $I_{-1}$ of the pixel P(1, i+2). Thus, the amount of the incident light ray $J_{-1}$ of the pixel P(2, i+1) is 0.3160 (=0.2604+0.0556).

In addition, the first drive circuit 30 calculates the amount of the incident light ray $J_{-1}$ of each of the pixels P(2, i+2) and P(2, i+3), P(2, i+4), and (2, i+5) in the same manner as the above-described incident light ray $J_{-1}$ of the pixel P(2, i+1). Thus, the amount of the incident light ray $J_{-1}$ of the pixel P(2, i+2) is 0.3146 (=0.2604+0.0542), and the amount of the incident light ray $J_{-1}$ of the pixel P(2, i+3) is 0.3080 (=0.2538+0.0542). The amount of the incident light ray $J_{-1}$ of the pixel P(2, i+4) is 0.3094 (=0.2538+0.0556), and the amount of the incident light ray $J_{-1}$ of the pixel P(2, i+5) is 0.3160 (0.2604+0.0556).

In a case in which the tilt angle is +20° (n=+2), the emission light ray $I_{+2}$ at one pixel P (P1) is incident on one pixel P (P2) adjacent to the pixel P1 on the +Y side of the pixel P1 and a pixel P (P3) adjacent to the pixel P2 on the +X side of the pixel P2 adjacent to the pixel P1 on the +Y side of the pixel P1. For example, the emission light ray $I_{+1}$ of the pixel P(1, i+2) is incident on the pixels P(2, i+2) and P(2, i+3).

Thus, in a case in which the tilt angle is +20° (n=+2), the first drive circuit 30 multiplies the amount of the emission light ray $I_{+2}$ of each pixel P in the first row (k=1) illustrated in FIG. 16 by the distribution ratio $r_0$ (specifically, 0.636) and the distribution ratio $r_+$ (specifically, 0.364) corresponding to n=+2 in the second table, thereby distributing the amount of the emission light ray $I_{+2}$ of each pixel P in the first row (k=1).

Specifically, as illustrated in FIG. 16, the amount of the emission light ray $I_{+2}$ of each of the pixels P(1, i+1), P(1, i+2), P(1, i+5), and P(1, i+6) is distributed as an amount of 0.1300 (=0.2043×0.636) and an amount of 0.0744 (=0.2043×0.364). The amount of the emission light ray $I_{+2}$ of each of the pixels P(1, i+3) and P(1, i+4) is distributed as an amount of 0.1267 (=0.1992×0.636) and an amount of 0.0725 (=0.1992×0.364).

Subsequently, the first drive circuit 30 calculates the amount of the incident light ray $J_{+2}$ of each pixel P in the second row (k=2) based on the distributed amounts of the emission light ray $I_{+2}$. Specifically, the correspondence relation between the emission light ray $I_{+2}$ of each pixel P in the first row and the incident light ray $J_{+2}$ of each pixel P in the second row in a case in which the tilt angle is +20° (n=+2) is the same as the above-described correspondence relation in a case in which the tilt angle is +10° (n=+1). The light amount corresponding to the distribution ratio $r_+$ in the amount of the emission light ray $I_{+2}$ of the pixel P(1, i+0) is 0.0744. Thus, the amount of the incident light ray $J_{+2}$ of the pixel P(2, i+1) is 0.2043 (=0.1300+0.0744). The dashed line arrow illustrated in FIG. 16 indicates that light corresponding to the distribution ratio $r_+$ in the emission light ray $I_{+2}$ of the pixel P(1, i+0) is incident on the pixel P(2, i+1).

The amount of the incident light ray $J_{+2}$ of the pixel P(2, i+2) is 0.2043 (=0.1300+0.0744). The amount of the incident light ray $J_{+2}$ of the pixel P(2, i+3) is 0.2011 (=0.1267+0.0744), and the amount of the incident light ray $J_{+2}$ of the pixel P(2, i+4) is 0.1922 (=0.1267+0.0725). The amount of the incident light ray $J_{+2}$ of the pixel P(2, i+5) is 0.2025 (=0.1300+0.0725), and the amount of the incident light ray $J_{+2}$ of the pixel P(2, i+6) is 0.2043 (0.1300+0.0744).

In a case in which the tilt angle is −20° (n=−2), the emission light ray $I_{-2}$ at one pixel P (P1) is incident on one pixel P (P2) adjacent to the pixel P1 on the +Y side of the pixel P1 and a pixel P (P3) adjacent to the pixel P2 on the −X side of the pixel P2 adjacent to the pixel P1 on the +Y side of the pixel P1. For example, the emission light ray $I_{-2}$ of the pixel P(1, 2) is incident on the pixel P(2, 2) and the pixel P(2, 1).

Thus, in a case in which the tilt angle is −20° (n=−2), the first drive circuit 30 multiplies the amount of the emission light ray $I_{-2}$ of each pixel P in the first row (k=1) illustrated in FIG. 17 by the distribution ratio $r_0$ (specifically, 0.636) and the distribution ratio $r_-$ (specifically, 0.364) corresponding to n=−2 in the second table, thereby distributing the amount of the emission light ray $I_{-2}$ of each pixel P in the first row (k=1).

Specifically, as illustrated in FIG. 17, the amount of the emission light ray $I_{-2}$ of each of the pixels P(1, i+1), P(1, i+2), P(1, i+5), and P(1, i+6) is distributed as an amount of 0.1300 (=0.2043×0.636) and an amount of 0.0744 (=0.2043×0.364). The amount of the emission light ray $I_{-2}$ of each of the pixels P(1, i+3) and P(1, i+4) is distributed as an amount of 0.1267 (=0.1992×0.636) and an amount of 0.0725 (=0.1992×0.364).

Subsequently, the first drive circuit 30 calculates the amount of the incident light ray $J_{-2}$ of each pixel P in the second row (k=2) based on the distributed amounts of the emission light ray $I_{-2}$. Specifically, the correspondence relation between the emission light ray $I_{-2}$ of each pixel P in the first row and the incident light ray $J_{-2}$ of each pixel P in the second row in a case in which the tilt angle is −20° (n=−2) is the same as the above-described correspondence relation in a case in which the tilt angle is −10° (n=−1). The light amount corresponding to the distribution ratio $r_-$ in the amount of the emission light ray $I_{-2}$ of the pixel P(1, i+7) is 0.0744. Thus, the amount of the incident light ray $J_{-2}$ of the pixel P(2, i+6) is 0.2043 (=0.1300+0.0744). The dashed line arrow illustrated in FIG. 17 indicates that light corresponding to the distribution ratio $r_-$ in the emission light ray $I_{-2}$ of the pixel P(1, i+7) is incident on the pixel P(2, i+6).

The amount of the incident light ray $J_{-2}$ of the pixel P(2, i+1) is 0.2043 (=0.1300+0.0744). The amount of the incident light ray $J_{-2}$ of the pixel P(2, i+2) is 0.2025 (=0.1300+0.0725), and the amount of the incident light ray $J_{-2}$ of the pixel P(2, i+3) is 0.1922 (=0.1267+0.0725). The amount of the incident light ray $J_{-2}$ of the pixel P(2, i+4) is 0.2011 (=0.1267+0.0744), and the amount of the incident light ray $J_{-2}$ of the pixel P(2, i+5) is 0.2043 (0.1300+0.0744).

In a case in which the tilt angle is +30° (n=+3), the emission light ray $I_{+3}$ at one pixel P (P1) is incident on one pixel P (P2) adjacent to the pixel P1 on the +Y side of the pixel P1 and a pixel P (P3) adjacent to the pixel P2 on the +X side of the pixel P2 adjacent to the pixel P1 on the +Y side of the pixel P1. For example, the emission light ray $I_{+3}$ of the pixel P(1, 1+2) is incident on the pixels P(2, i+2) and P(2, i+3).

Thus, in a case in which the tilt angle is +30° (n=+3), the first drive circuit 30 multiplies the amount of the emission light ray $I_{+3}$ of each pixel P in the first row (k=1) illustrated in FIG. 18 by the distribution ratio $r_0$ (specifically, 0.423) and the distribution ratio $r_+$ (specifically, 0.577) corresponding to n=+3 in the second table, thereby distributing the amount of the emission light ray $I_{+3}$ of each pixel P in the first row (k=1).

Specifically, as illustrated in FIG. 18, the amount of the emission light ray $I_{+3}$ of each of the pixels P(1, i+1), P(1, i+2), P(1, i+5), and P(1, i+6) is distributed as an amount of 0.382 (=0.0903×0.423) and an amount of 0.0521 (=0.0903× 0.577). The amount of the emission light ray $I_{+3}$ Of each of the pixels P(1, i+3) and P(1, i+4) is distributed as an amount of 0.0372 (=0.0880×0.423) and an amount of 0.0508 (=0.0880×0.577).

Subsequently, the first drive circuit 30 calculates the amount of the incident light ray $J_{+3}$ of each pixel P in the second row (k=2) based on the distributed amounts of the emission light ray $I_{+3}$. Specifically, the correspondence relation between the emission light ray $I_{+3}$ of each pixel P in the first row and the incident light ray $J_{+3}$ of each pixel P in the second row in a case in which the tilt angle is +30° (n=+3) is the same as the above-described correspondence relation in a case in which the tilt angle is +10° (n=+1). The light amount corresponding to the distribution ratio $r_+$ in the amount of the emission light ray $I_{+3}$ of the pixel P(1, 1+0) is 0.0521. Thus, the amount of the incident light ray $J_{+3}$ of the pixel P(2, i+1) is 0.0903 (=0.0382+0.0521). The dashed line arrow illustrated in FIG. 18 indicates that light corresponding to the distribution ratio $r_+$ in the emission light ray $I_{+3}$ of the pixel P(1, 1+0) is incident on the pixel P(2, i+1).

The amount of the incident light ray $J_{+3}$ of the pixel P(2, i+2) is 0.0903 (=0.0382+0.0521). The amount of the incident light ray $J_{+3}$ of the pixel P(2, i+3) is 0.0893 (=0.0372+0.0521), and the amount of the incident light ray $J_{+3}$ of the pixel P(2, i+4) is 0.0880 (=0.0372+0.0508). The amount of the incident light ray $J_{+3}$ of the pixel P(2, i+5) is 0.0890 (=0.0382+0.0508), and the amount of the incident light ray $J_{+3}$ of the pixel P(2, i+6) is 0.0903 (0.0382+0.0521).

In a case in which the tilt angle is −30° (n=−3), the emission light ray $I_{-3}$ at one pixel P (P1) is incident on one pixel P (P2) adjacent to the pixel P1 on the +Y side of the pixel P1 and a pixel P (P3) adjacent to the pixel P2 on the −X side of the pixel P2 adjacent to the pixel P1 on the +Y side of the pixel P1. For example, the emission light ray $I_{-3}$ of the pixel P(1, i+2) is incident on the pixels P(2, i+2) and (2, i+1).

Thus, in a case in which the tilt angle is −30° (n=−3), the first drive circuit 30 multiplies the amount of the emission light ray $I_{-3}$ of each pixel P in the first row (k=1) illustrated in FIG. 19 by the distribution ratio $r_0$ (specifically, 0.423) and the distribution ratio $r_-$ (specifically, 0.577) corresponding to n=−3 in the second table, thereby distributing the amount of the emission light ray $I_{-3}$ of each pixel P in the first row (k=1).

Specifically, as illustrated in FIG. 19, the amount of the emission light ray $I_{-3}$ of each of the pixels P(1, i+1), P(1, i+2), P(1, i+5), and P(1, i+6) is distributed as an amount of 0.382 (=0.0903×0.423) and an amount of 0.0521 (=0.0903× 0.577). The amount of the emission light ray $I_{-3}$ of each of the pixels P(1, i+3) and P(1, i+4) is distributed as an amount of 0.0372 (=0.0880×0.423) and an amount of 0.0508 (=0.0880×0.577).

Subsequently, the first drive circuit 30 calculates the amount of the incident light ray $J_{-3}$ of each pixel P in the second row (k=2) based on the distributed amounts of the emission light ray $I_{-3}$. Specifically, the correspondence relation between the emission light ray $I_{-3}$ of each pixel P in the first row and the incident light ray $J_{-3}$ of each pixel P in the second row in a case in which the tilt angle is −30° (n=−3) is the same as the above-described correspondence relation in a case in which the tilt angle is −10° (n=−1). The light amount corresponding to the distribution ratio $r_-$ in the amount of the emission light ray $I_{-3}$ of the pixel P(1, i+7) is 0.0521. Thus, the amount of the incident light ray $J_{-3}$ of the pixel P(2, i+6) is 0.0903 (=0.0382+0.0521). The dashed line arrow illustrated in FIG. 17 indicates that light corresponding to the distribution ratio $r_-$ in the emission light ray $I_{-3}$ of the pixel P(1, i+7) is incident on the pixel P(2, i+6).

The amount of the incident light ray $J_{-3}$ of the pixel P(2, i+1) is 0.0903 (=0.0382+0.0521). The amount of the incident light ray $J_{-3}$ of the pixel P(2, i+2) is 0.0890 (=0.0382+ 0.0508), and the amount of the incident light ray $J_{-3}$ of the pixel P(2, i+3) is 0.0880 (=0.0372+0.0508). The amount of the incident light ray $J_{-3}$ of the pixel P(2, i+4) is 0.0893 (=0.0372+0.0521), and the amount of the incident light ray $J_{-3}$ of the pixel P(2, i+5) is 0.0903 (0.0382+0.0521).

Subsequently at step S4, the first drive circuit 30 calculates the sum of the amounts of the incident light rays $J_n$ for each selected pixel P. Specifically, the first drive circuit 30 sums the amounts of the incident light rays $J_{-3}$, $J_{-2}$, $J_{-1}$, $J_0$, $J_{+1}$, $J_{+2}$, and $J_{+3}$ of each pixel P in the second row.

Specifically, as illustrated in FIG. 11, the sum of the amounts of the incident light rays $J_n$ (in other words, the incident light rays $J_{-3}$, $J_{-2}$, $J_{-1}$, $J_0$, $J_{+1}$, $J_{+2}$, and $J_{+3}$) of the pixel P(2, i+1) is 1.5840 (=0.0903 (FIG. 19)+0.2043 (FIG. 17)+0.3160 (FIG. 15)+0.3627 (FIG. 13)+0.3160 (FIG. 14)+ 0.2043 (FIG. 16)+0.0903 (FIG. 18)). Similarly, the sum of the amounts of the incident light rays $J_n$ of the pixel P(2, i+6) is 1.5840 (=0.0903+0.2043+0.3160+0.3627+0.3160+ 0.2043+0.0903).

The sum of the amounts of the incident light rays $J_n$ of each of the pixels P(2, i+2) and P(2, i+5) is 1.5794 (=0.0903+0.2043+0.3160+0.3627+0.3146+0.2025+ 0.0890). The sum of the amounts of the incident light rays $J_n$ of each of the pixels P(2, i+3) and P(2, i+4) is 1.5486 (=0.0893+0.2011+0.3094+0.3536+0.3080+0.1992+0.0880).

At step S5, the first drive circuit 30 calculates an output gradation value for each selected pixel P. Specifically, the first drive circuit 30 uses the input gradation values illustrated in FIG. 8 and the sum of the amounts of the incident light rays $J_n$ illustrated in FIG. 11 to calculate an output gradation value (=input gradation value/sum of the amounts of the incident light rays $J_n$) for each pixel P in the second row by dividing the input gradation value by the sum of the amounts of the incident light rays $J_n$.

Since the input gradation values of the pixels P(2, i+1), P(2, i+2), P(2, i+5), and P(2, i+6) are 0 as illustrated in FIG. 8, the output gradation values of the pixels P(2, i+1), P(2, i+2), P(2, i+5), and P(2, i+6) are 0 as illustrated in FIG. 12. Since the input gradation values of the pixels P(2, i+3) and P(2, i+4) are 0.8 as illustrated in FIG. 8, the output gradation values of the pixels P(2, i+3) and P(2, i+4) are 0.5166 (=0.8 (FIG. 8)/1.5486 (FIG. 11)) as illustrated in FIG. 12.

As illustrated in FIG. 11, since light of the light sources SL is consumed in the pixels P in the first row, the sum of the amounts of the incident light rays $J_n$ of each pixel P in the second row is smaller than the sum of the amounts of the incident light rays $J_n$ of each pixel P in the first row.

Among the pixels P in the (i+3)-th and (i+4)-th columns, the input gradation values (0.8) of the pixels P in the first row are equal to the input gradation values (0.8) of the pixels P in the second row as illustrated in FIG. 8, but the output gradation values (0.5166) of the pixels P in the second row are larger than the output gradation values (0.500) of the pixels P in the first row as illustrated in FIG. 12. Thus, although the input gradation values of the pixels P in the first row are equal to the input gradation values of the pixels P in the second row, the first drive circuit 30 increases the output gradation values of the pixels P in the second row based on the consumed amount of light of the light sources SL of the pixels P in the first row.

Subsequently at step S6, the first drive circuit 30 determines whether k is equal to or larger than the predetermined value. In the case of k=2, k is smaller than the predetermined value. In this case (No at step S6), the first drive circuit 30 calculates a light amount transmission ratio for each selected pixel P at step S7.

As described above, the first predetermined ratio (1%) and the second predetermined ratio (5%) are constant irrespective of the position of a pixel P. The first decrease ratio corresponds to the first predetermined ratio.

The second decrease ratio changes in accordance with the corresponding output gradation value illustrated in FIG. 12. Specifically, the second decrease ratios of the pixels P(2, i+1), P(2, i+2), P(2, i+5), and P(2, i+6) among the pixels P in the second row are 0 (=0×0.05 (the second predetermined ratio: 5%)). The second decrease ratios of the pixels P(2, i+3) and P(2, i+4) are 0.0258 (=0.5166×0.05 (the second predetermined ratio: 5%)).

Accordingly, the transmission ratios of the pixels P(2, i+1), P(2, i+2), P(2, i+5), and P(2, i+6) among the pixels P in the second row are 0.99 (=1-0.01-0). The transmission ratios of the pixels P(2, i+3) and P(2, i+4) are 0.9642 (=1-0.01-0.0258).

At step S8, the first drive circuit 30 calculates the amount of the emission light ray $I_n$ at each tilt angle for each selected pixel P.

FIG. 22 is a diagram illustrating the amount of the incident light ray $J_0$ and the amount of the emission light ray $I_0$ at each pixel P in the second row and the amount of the incident light ray $J_0$ at each pixel P in the third row in a case in which the tilt angle is 0° (n=0). The amount of the incident light ray $J_0$ at each of the pixels P(2, i+1), P(2, i+2), P(2, i+3), P(2, i+4), P(2, i+5), and P(2, i+6) in the second row is calculated at step S3 described above (FIG. 13).

The first drive circuit 30 multiplies the amount of the incident light ray $J_0$ by the above-described transmission ratio, thereby calculating the amount of the emission light ray $I_0$ for each pixel P in the second row. Specifically, the amount of the emission light ray $I_0$ of each of the pixels P(2, i+1), P(2, i+2), P(2, i+5), and P(2, i+6) is 0.3591 (=0.3637×0.99). The amount of the emission light ray $I_0$ of each of the pixels P(2, i+3) and P(2, i+4) is 0.3409 (=0.3536×0.9642).

FIG. 23 is a diagram illustrating the amount of the incident light ray $J_{+1}$ and the amount of the emission light ray $I_{+1}$ at each pixel P in the second row and the amount of the incident light ray $J_{+1}$ at each pixel P in the third row in a case in which the tilt angle is +10° (n=+1). The amount of the incident light ray $J_{+1}$ at each of the pixels P(2, i+1), P(2, i+2), P(2, i+3), P(2, i+4), P(2, i+5), and P(2, i+6) in the second row is calculated at step S3 described above (FIG. 14).

The first drive circuit 30 multiplies the amount of the incident light ray $J_{+1}$ by the above-described transmission ratio, thereby calculating the amount of the emission light ray $I_{+1}$ for each pixel P in the second row. Specifically, the amounts of the emission light rays $I_{+1}$ of the pixels P(2, i+1), P(2, i+2), P(2, i+3), P(2, i+4), P(2, i+5), and P(2, i+6) are 0.3128 (=0.3160×0.99), 0.3128 (=0.3160×0.99), 0.2983 (=0.3094×0.9642), 0.2970 (=0.3080×0.9642), 0.3115 (=0.3146×0.99), and 0.3128 (=0.3160×0.99).

FIG. 24 is a diagram illustrating the amount of the incident light ray $J_{-1}$ and the amount of the emission light ray $I_{-1}$ of each pixel P in the second row and the amount of the incident light ray $J_{-1}$ at each pixel P in the third row in a case in which the tilt angle is −10° (n=−1). The amount of the incident light ray $J_{-1}$ at each of the pixels P(2, i+1), P(2, i+2), P(2, i+3), P(2, i+4), P(2, i+5), and P(2, i+6) in the second row is calculated at step S3 described above (FIG. 15).

The first drive circuit 30 multiplies the amount of the incident light ray $J_{-1}$ by the above-described transmission ratio, thereby calculating the amount of the emission light ray $I_{-1}$ for each pixel P in the second row. Specifically, the amounts of the emission light rays $I_{-1}$ of the pixels P(2, i+1), P(2, i+2), P(2, i+3), P(2, i+4), P(2, i+5), and P(2, i+6) are 0.3128 (=0.3160×0.99), 0.3115 (=0.3146×0.99), 0.2970 (=0.3080×0.9642), 0.2983 (=0.3094×0.9642), 0.3128 (=0.3160×0.99), and 0.3128 (=0.3160×0.99).

FIG. 25 is a diagram illustrating the amount of the incident light ray $J_{+2}$ and the amount of the emission light ray $I_{+2}$ at each pixel P in the second row and the amount of the incident light ray $J_{+2}$ at each pixel P in the third row in a case in which the tilt angle is +20° (n=+2). The amount of the incident light ray $J_{+2}$ at each of the pixels P(2, i+1), P(2, i+2), P(2, i+3), P(2, i+4), P(2, i+5), and P(2, i+6) in the second row is calculated at step S3 described above (FIG. 16).

The first drive circuit 30 multiplies the amount of the incident light ray $J_{+2}$ by the above-described transmission ratio, thereby calculating the amount of the emission light ray $I_{+2}$ for each pixel P in the second row. Specifically, the amounts of the emission light rays $I_{+2}$ of the pixels P(2, i+1), P(2, i+2), P(2, i+3), P(2, i+4), P(2, i+5), and P(2, i+6) are 0.2023 (=0.2043×0.99), 0.2023 (=0.2043×0.99), 0.1939 (=0.2011×0.9642), 0.1920 (=0.1992×0.9642), 0.2004 (=0.2025×0.99), and 0.2023 (=0.2043×0.99).

FIG. 26 is a diagram illustrating the amount of the incident light ray $J_{-2}$ and the amount of the emission light ray $I_{-2}$ at each pixel P in the second row and the amount of the incident light ray $J_{-2}$ at each pixel P in the third row in a case in which the tilt angle is −20° (n=−2). The amount of the incident light ray $J_{-2}$ at each of the pixels P(2, i+1), P(2, i+2), P(2, i+3), P(2, i+4), P(2, i+5), and P(2, i+6) in the second row is calculated at step S3 described above (FIG. 17).

The first drive circuit 30 multiplies the amount of the incident light ray $J_{-2}$ by the above-described transmission ratio, thereby calculating the amount of the emission light ray $I_{-2}$ for each pixel P in the second row. Specifically, the amounts of the emission light rays $I_{-1}$ of the pixels P(2, i+1), P(2, i+2), P(2, i+3), P(2, i+4), P(2, i+5), and P(2, i+6) are 0.2023 (=0.2043×0.99), 0.2004 (=0.2025×0.99), 0.1920 (=0.1992×0.9642), 0.1939 (=0.2011×0.9642), 0.2023 (=0.2043×0.99), and 0.2023 (=0.2043×0.99).

FIG. 27 is a diagram illustrating the amount of the incident light ray $J_{+3}$ and the amount of the emission light ray $I_{+3}$ at each pixel P in the second row and the amount of the incident light ray $J_{+3}$ at each pixel P in the third row in a case in which the tilt angle is +30° (n=+3). The amount of the incident light ray $J_{+3}$ at each of the pixels P(2, i+1), P(2, i+2), P(2, i+3), P(2, i+4), P(2, i+5), and P(2, i+6) in the second row is calculated at step S3 described above (FIG. 18).

The first drive circuit 30 multiplies the amount of the incident light ray $J_{+3}$ by the above-described transmission ratio, thereby calculating the amount of the emission light ray $I_{+3}$ for each pixel P in the second row. Specifically, the amounts of the emission light rays $I_{+3}$ of the pixels P(2, i+1), P(2, i+2), P(2, i+3), P(2, i+4), P(2, i+5), and P(2, i+6) are 0.0894 (=0.0903×0.99), 0.0894 (=0.0903×0.99), 0.0861 (=0.0893×0.9642), 0.0849 (=0.0880×0.9642), 0.0881 (=0.0890×0.99), and 0.0894 (=0.0903×0.99).

FIG. 28 is a diagram illustrating the amount of the incident light ray $J_{-3}$ and the amount of the emission light ray $I_{-3}$ at each pixel P in the second row and the amount of the incident light ray $J_{-3}$ at each pixel P in the third row in a case in which the tilt angle is −30° (n=−3). The amount of the incident light ray $J_{-3}$ at each of the pixels P(2, i+1), P(2, i+2), P(2, i+3), P(2, i+4), P(2, i+5), and P(2, i+6) in the second row is calculated at step S3 described above (FIG. 19).

The first drive circuit 30 multiplies the amount of the incident light ray $J_{-3}$ by the above-described transmission ratio, thereby calculating the amount of the emission light ray $I_{-3}$ for each pixel P in the second row. Specifically, the amounts of the emission light rays $I_{-1}$ of the pixels P(2, i+1), P(2, i+2), P(2, i+3), P(2, i+4), P(2, i+5), and P(2, i+6) are 0.0894 (=0.0903×0.99), 0.0881 (=0.0890×0.99), 0.0849 (=0.0880×0.9642), 0.0861 (=0.0893×0.9642), 0.0894 (=0.0903×0.99), and 0.0894 (=0.0903×0.99).

Subsequently at step S9, the first drive circuit 30 adds 1 to k (in other words, sets k=k+1). In the case of k=2, the first drive circuit 30 sets k=3 (=2+1). Then, the first drive circuit 30 returns the program to step S2.

At step S2, the first drive circuit 30 selects the pixels P in the k-th row. In the case of k=3, the first drive circuit 30 selects the pixels P in the third row.

At step S3, the first drive circuit 30 calculates the amount of the incident light ray $J_n$ at each tilt angle for each selected pixel P. As described above, in the case of k≥ 2, at step S3, the first drive circuit 30 calculates the amount of the incident light ray $J_n$ at each tilt angle for each pixel P in the k-th row by using the amounts of the emission light rays $I_n$ in the (k−1)-th row and the second table.

Specifically, at step S3, the first drive circuit 30 calculates the amount of the incident light ray $J_n$ at each tilt angle for each pixel P in the third row (k=3) by using the amounts of the emission light rays $I_n$ in the second row (k=2) and the second table as in the above-described case of k=2.

In a case in which the tilt angle is 0° (n=0), the first drive circuit 30 multiplies the amount of the emission light ray $I_0$ of each pixel P in the second row (k=2) illustrated in FIG. 22 by the distribution ratio $r_0$ (specifically, 1) corresponding to n=0 in the second table, thereby calculating the amount of the incident light ray $J_0$ for each pixel P in the third row (k=3).

Specifically, as illustrated in FIG. 22, the amount of the incident light ray $J_0$ of each of the pixels P(3, i+1), P(3, i+2), P(3, i+5), and P(3, i+6) among the pixels P in the third row is 0.3591 (=0.3591×1). The amount of the incident light ray $J_0$ of each of the pixels P(3, i+3) and P(3, i+4) is 0.3409 (=0.3409×1).

In a case in which the tilt angle is +10° (n=+1), the first drive circuit 30 multiplies the amount of the emission light ray $I_{+1}$ of each pixel P in the second row (k=2) illustrated in FIG. 23 by the distribution ratio $r_0$ (specifically, 0.824) and the distribution ratio $r_+$ (specifically, 0.176) corresponding to n=+1 in the second table, thereby distributing the amount of the emission light ray $I_{+1}$ of each pixel P in the second row (k=2).

Subsequently, the first drive circuit 30 calculates the amount of the incident light ray $J_{+1}$ of each pixel P in the third row (k=3) based on the distributed amounts of the emission light ray $I_{+1}$. Specifically, the amounts of the incident light rays $J_{+1}$ of the pixels P(3, i+1) and P(3, i+2), P(3, i+3), P(3, i+4), P(3, i+5), P(3, i+6) are 0.3128, 0.3128, 0.3009, 0.2972, 0.3089, and 0.3126.

In a case in which the tilt angle is −10° (n=−1), the first drive circuit 30 multiplies the amount of the emission light ray $I_{-1}$ of each pixel P in the second row (k=2) in FIG. 24 by the distribution ratio $r_0$ (specifically, 0.824) and the distribution ratio $r_-$ (specifically, 0.176) corresponding to n=−1 in the second table, thereby distributing the amount of the emission light ray $I_{-1}$ of each pixel P in the second row (k=2).

Subsequently, the first drive circuit 30 calculates the amount of the incident light ray $J_{-1}$ of each pixel P in the third row (k=3) based on the distributed amounts of the emission light ray $I_{-1}$. Specifically, the amounts of the incident light rays $J_{-1}$ of the pixels P(3, i+1), P(3, i+2), P(3, i+3), P(3, i+4), P(3, i+5), and P(3, i+6) are 0.3126, 0.3089, 0.2972, 0.3009, 0.3128, and 0.3128.

In a case in which the tilt angle is +20° (n=+2), the first drive circuit 30 multiplies the amount of the emission light ray $I_{+2}$ of each pixel P in the second row (k=2) illustrated in FIG. 25 by the distribution ratio $r_0$ (specifically, 0.636) and the distribution ratio $r_+$ (specifically, 0.364) corresponding to n=+2 in the second table, thereby distributing the amount of the emission light ray $I_{+2}$ of each pixel P in the second row (k=2).

Subsequently, the first drive circuit 30 calculates the amount of the incident light ray $J_{+2}$ of each pixel P in the third row (k=3) based on the distributed amounts of the emission light ray $I_{+2}$. Specifically, the amounts of the incident light rays $J_{+2}$ of the pixels P(3, i+1), P(3, i+2), P(3, i+3), P(3, i+4), P(3, i+5), and P(3, i+6) are 0.2023, 0.2023, 0.1969, 0.1927, 0.1974, and 0.2016.

In a case in which the tilt angle is −20° (n=−2), the first drive circuit 30 multiplies the amount of the emission light ray $I_{-2}$ of each pixel P in the second row (k=2) illustrated in FIG. 26 by the distribution ratio $r_0$ (specifically, 0.636) and the distribution ratio $r_-$ (specifically, 0.364) corresponding to n=−2 in the second table, thereby distributing the amount of the emission light ray $I_{-2}$ of each pixel P in the second row (k=2).

Subsequently, the first drive circuit 30 calculates the amount of the incident light ray $J_{-2}$ of each pixel P in the third row (k=3) based on the distributed amounts of the emission light ray $I_{-2}$. Specifically, the amounts of the incident light rays $J_{-2}$ of the pixels P(3, i+1), P(3, i+2), P(3, i+3), P(3, i+4), P(3, i+5), and P(3, i+6) are 0.2016, 0.1974, 0.1927, 0.1969, 0.2023, and 0.2023.

In a case in which the tilt angle is +30° (n=+3), the first drive circuit 30 multiplies the amount of the emission light ray $I_{+3}$ of each pixel P in the second row (k=2) illustrated in FIG. 27 by the distribution ratio $r_0$ (specifically, 0.423) and the distribution ratio $r_+$ (specifically, 0.577) corresponding to n=+3 in the second table, thereby distributing the amount of the emission light ray $I_{+3}$ of each pixel P in the second row (k=2).

Subsequently, the first drive circuit 30 calculates the amount of the incident light ray $J_{+3}$ of each pixel P in the third row (k=3) based on the distributed amounts of the emission light ray $I_{+3}$. Specifically, the amounts of the incident light rays $J_{+3}$ of the pixels P(3, 1+1), P(3, i+2), P(3, i+3), P(3, i+4), P(3, i+5), and P(3, i+6) are 0.0894, 0.0894, 0.0880, 0.0856, 0.0862, and 0.0886.

In a case in which the tilt angle is −30° (n=−3), the first drive circuit 30 multiplies the amount of the emission light ray $I_{-3}$ of each pixel P in the second row (k=2) illustrated in FIG. 28 by the distribution ratio $r_0$ (specifically, 0.423) and the distribution ratio $r_-$ (specifically, 0.577) corresponding to $n=-3$ in the second table, thereby distributing the amount of the emission light ray $I_{-3}$ of each pixel P in the second row ($k=2$).

Subsequently, the first drive circuit 30 calculates the amount of the incident light ray $J_{-3}$ of each pixel P in the third row ($k=3$) based on the distributed amounts of the emission light ray $I_{-3}$. Specifically, the amounts of the incident light rays $J_{-3}$ of the pixels P(3, i+1), P(3, i+2), P(3, i+3), P(3, i+4), P(3, i+5), and P(3, i+6) are 0.0886, 0.0862, 0.0856, 0.0880, 0.0894, and 0.0894.

Subsequently at step S4, the first drive circuit 30 calculates the sum of the amounts of the incident light rays $J_n$ for each selected pixel P. Specifically, the first drive circuit 30 sums the amounts of the incident light rays $J_n$ (in other words, the incident light rays $J_{-3}$, $J_{-2}$, $J_{-1}$, $J_0$, $J_{+1}$, $J_{+2}$, and $J_{+3}$) of each pixel P in the third row.

Specifically, as illustrated in FIG. 11, the sums of the amounts of the incident light rays $J_n$ of the pixels P(3, i+1), P(3, i+2), P(3, i+3), P(3, i+4), P(3, i+5), and P(3, i+6) are 1.5665, 1.5561, 1.5022, 1.5022, 1.5561, and 1.5665.

At step S5, the first drive circuit 30 calculates an output gradation value (=input gradation value (FIG. 8)/sum of the amounts of the incident light rays $J_n$ (FIG. 11)) for each selected pixel P.

Since the input gradation values of the pixels P(3, i+1), P(3, i+2), P(3, i+5), and P(3, i+6) are 0 as illustrated in FIG. 8, the output gradation values of the pixels P(3, i+1), P(3, i+2), P(3, i+5), and P(3, i+6) are 0 as illustrated in FIG. 12. Since the input gradation values of the pixels P(3, i+3) and P(3, i+4) are 0.8 as illustrated in FIG. 8, the output gradation values of the pixels P(3, i+3) and P(3, i+4) are 0.5325 (=0.8 (FIG. 8)/1.5022 (FIG. 11)) as illustrated in FIG. 12.

In addition, the first drive circuit 30 executes steps S6, S7, S8, and S9, and then selects the pixels P in the fourth row ($k=4$) at step S2 and executes steps S4 and S5 as in the above-described cases of $k=2$ and 3, thereby calculating the sum of the amounts of the incident light rays $J_n$ (FIG. 11) and an output gradation value (=input gradation value (FIG. 8)/sum of the amounts of the incident light rays $J_n$ (FIG. 11)) for each pixel P in the fourth row.

Since the input gradation values of the pixels P(4, i+1), P(4, i+2), P(4, i+5), and P(4, i+6) are 0 as illustrated in FIG. 8, the output gradation values of the pixels P(4, i+1), P(4, i+2), P(4, i+5), and P(4, i+6) are 0 as illustrated in FIG. 12. Since the input gradation values of the pixels P(4, i+3) and P(4, i+4) are 0.8 as illustrated in FIG. 8, the output gradation values of the pixels P(4, i+3) and P(4, i+4) are 0.5479 (=0.8 (FIG. 8)/1.4602 (FIG. 11)) as illustrated in FIG. 12.

As illustrated in FIG. 11, since light of the light sources SL is consumed at pixels P, the sum of the amounts of the incident light rays $J_n$ of each pixel P in the (k+1)-th row is smaller than the sum of the amounts of the incident light rays $J_n$ of each pixel P in the k-th row.

As illustrated in FIGS. 8 and 12, among the pixels P in the (i+3)-th and (i+4)-th columns, the input gradation values of the pixels P in the k-th row are equal to the input gradation values of the pixels P in the (k+1)-th row (FIG. 8), but the output gradation values of the pixels P in the (k+1)-th row are larger than the output gradation values of the pixels P in the k-th row (FIG. 12).

Thus, the first drive circuit 30 increases the output gradation values of the pixels P in the (k+1)-th row based on the consumed amount of light of the light sources SL at the pixels P in the k-th row. Specifically, in a case in which the two input gradation values corresponding to two pixels P arranged in the Y direction (first direction) are equal to each other, the first drive circuit 30 sets the output gradation value corresponding to the pixel P on the second side surface 10d side among the two pixels P to be larger than the output gradation value corresponding to the pixel P on the first side surface 10c side among the two pixels P.

In addition, the first drive circuit 30 calculates, for each selected pixel P, the amounts of the emission light rays $I_n$ of each pixel P in the (k−1)-th row, in other words, the incident light rays $J_n$, of each pixel P in the k-th row by using the above-described transmission ratio. Specifically, the first drive circuit 30 calculates the amounts of the incident light rays $J_n$ (the amount of light of the light sources SL (light source device 20)) incident on each pixel P on the second side surface 10d side by using the degree (first decrease ratio) of first light scattering that occurs when light of the light sources SL (light of the light source device 20) bounces off an element of the display panel 10 at each pixel P on the first side surface 10c side. In addition, the first drive circuit 30 calculates the amounts of the incident light rays $J_n$ (the amount of light of the light sources SL (light source device 20)) incident on each pixel P on the second side surface 10d side by using the degree (second decrease ratio) of second light scattering that changes with the output gradation value at each pixel P on the first side surface 10c side.

With the output gradation values thus calculated, among the pixels P in the (i+3)-th and (i+4)-th columns, the pixels P in the first row in the display region DA have luminance (=(the sum of the amounts of the incident light rays $J_n$ (FIG. 11))×(output gradation value (FIG. 12))) of 0.8000 (=1.6× 0.500), and the pixels P in the second row in the display region DA have luminance of 0.8000 (=1.5486×0.5166). The pixels P in the third row in the display region DA have luminance of 0.7999 (=1.5022×0.5325), and the pixels P in the fourth row in the display region DA have luminance of 0.8000 (=1.4602×0.5479).

Accordingly, among the pixels P in the (i+3)-th and (i+4)-th columns, the luminances of the pixels P are substantially equalized even in a case in which the input gradation values thereof are equal to each other as illustrated in FIG. 8 and the amount of light of the light sources SL decreases from the −Y side toward the +Y side in the Y direction as illustrated in FIG. 11.

When k is equal to or larger than the predetermined value (Yes at step S6), the first drive circuit 30 has calculated the output gradation values corresponding to all pixels P. Thus, the first drive circuit 30 ends the program illustrated in FIG. 10 and generates pixel drive signals through inverse gamma correction of the output gradation values.

The following describes the above-described adjustment coefficient and the luminance of each pixel P in the (i+3)-th and (i+4)-th columns and the fifth and subsequent rows.

Figure 29:
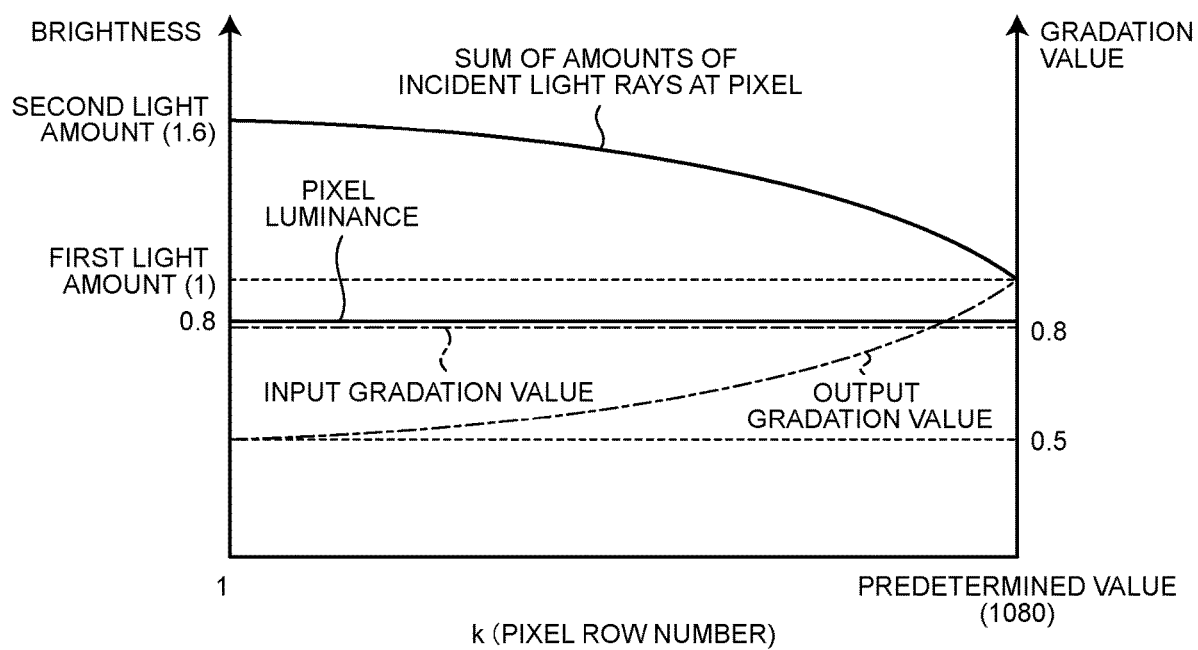
FIG. 29 is a diagram illustrating the brightness and gradation value of a pixel P in the (i+3)-th or (i+4)-th columns illustrated in FIGS. 8, 11, and 12 when the first drive circuit calculates output gradation values by using an adjustment coefficient in the display device according to the embodiment of the present disclosure.

FIG. 29 is a diagram illustrating the brightness and gradation value of a pixel P in the (i+3)-th or (i+4)-th columns illustrated in FIGS. 8, 11, and 12 when the first drive circuit 30 calculates output gradation values by using the adjustment coefficient in the display device 1 according to the embodiment of the present disclosure. In FIG. 29, k on the horizontal axis represents the row number of a pixel P in the (i+3)-th and (i+4)-th columns. In FIG. 29, brightness on the vertical axis represents the sum of the amounts of the incident light rays $J_n$ at a pixel P in the (i+3)-th and (i+4)-th columns and the k-th row and the luminance of the pixel P. As described above, the input gradation values of the pixels P in the (i+3)-th and (i+4)-th columns are constant at 0.8 and equal to each other.

As described above, the second light amount is calculated by multiplying the first light amount by the adjustment coefficient (in the present embodiment, 1.6). The adjustment coefficient is set to be a value with which, when a plurality of input gradation values corresponding to a plurality of pixels P arranged in the Y direction are equal to one another at a predetermined gradation value, the sum of the amounts of the incident light rays $J_n$ at the pixel P positioned farthest on the second side surface 10$d$ side (in other words, the pixel P at k=the predetermined value (1080) in FIG. 29) among the pixels P arranged in the Y direction is equal to the first light amount. The adjustment coefficient varies depending on, for example, the size and structure of the display panel 10 and is derived in advance by experiment or the like performed in advance and stored in the storage of the first drive circuit 30.

The value of the adjustment coefficient is changeable as appropriate. The adjustment coefficient is 1.6 in the present embodiment but may be 1.0 or smaller in accordance with a display state and a use state. In this case, the second light amount is smaller than the first light amount, and luminance inequality of an image can be reduced even when the image is dark in the entire display region DA.

The predetermined gradation value is a gradation value determined based on, for example, the size and structure of the display panel 10 and is 0.8 in the present embodiment. Specifically, the adjustment coefficient is set to a value with which, when a plurality of input gradation values corresponding to a plurality of pixels P arranged in the Y direction are equal to one another at the predetermined gradation value, the sum of the amounts of the incident light rays $J_n$ at the pixel P positioned farthest on the second side surface 10$d$ side (pixel P at k=the predetermined value (1080)) among the pixels P arranged in the Y direction is equal to the first light amount (1).

In other words, in a case in which a plurality of input gradation values corresponding to a plurality of pixels P arranged in the Y direction (first direction) are equal to one another, with use of the adjustment coefficient, the amount of light of the light sources SL (the sum of the amounts of the incident light rays $J_n$) incident on each pixel P (corresponding to a fourth pixel closest to the first side surface 10$c$) in the first row positioned farthest on the first side surface 10$c$ side among the pixels P arranged in the Y direction when the amount of light of the light sources SL (the amount of light of the light source device 20) is equal to the first light amount is equal to the amount of light of the light sources SL (the sum of the amounts of the incident light rays $J_n$) incident on each pixel P (corresponding to a fourth pixel closest to the second side surface 10$d$) in the row of the predetermined value, which is positioned farthest on the second side surface 10$d$ side among the pixels P arranged in the Y direction when the amount of light of the light sources SL is equal to the second light amount larger than the first light amount.

Accordingly, the sum of the amounts of the incident light rays $J_n$ at a pixel P in the (i+3)-th and (i+4)-th columns, which is calculated by the first drive circuit 30 in accordance with the flowchart illustrated in FIG. 10, gradually decreases from the second light amount (1.6) for the pixels P in the first row to the first light amount (1) for the pixels P in the row of the predetermined value.

In a case in which the input gradation values of the pixels P in the (i+3)-th and (i+4)-th columns are equal to one another at 0.8, the output gradation value (=the input gradation value/the sum of the amounts of the incident light rays $J_n$) of a pixel P in the (i+3)-th and (i+4)-th columns, which is calculated by the first drive circuit 30 in accordance with the flowchart illustrated in FIG. 10, gradually increases from 0.5 for the pixels P in the first row to 1 for the pixels P in the row of the predetermined value.

Accordingly, the luminance (=(sum of the amounts of the incident light rays $J_n$)×(output gradation value)) of each of the pixels P in the (i+3)-th and (i+4)-th columns is substantially 0.8 for the pixels P in the first row to the row of the predetermined value and thus equalized. Moreover, the luminance of each pixel P is substantially equal to the input gradation value thereof, and desired luminance can be obtained for the pixel P.

In other words, the first drive circuit 30 calculates output gradation values by using the adjustment coefficient to set the amount of light of the light sources SL to an amount with which the sum of the amounts of the incident light rays $J_n$ of the pixel P in the first row is equal to the second light amount, whereby the luminance can be equalized among the pixels P in the first row to the row of the predetermined value.

Thus, in a case in which the display device 1 is operated to display white in the entire display region DA, in other words, in a case in which the input gradation values of all the pixels P set to 1, the luminance is equalized among the pixels P, and white is displayed with gradation equalized in the display region DA. Moreover, in a case in which the display device 1 is operated to display red in part of the display region DA, the complementary color (cyan) of red is not displayed in the display region DA on the second side surface 10$d$ side of the part of the display region DA since the luminance is equalized among the pixels P. Accordingly, a desired color is displayed in the display region DA.

In this manner, in the display device 1 including the display panel 10 on which light of the light source device 20 is incident from a lateral side, the luminance can be equalized when a plurality of gradation values corresponding to a plurality of pixels P are equal to one another.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

For example, the light source device 20 may be disposed facing one of the fourth XL side surface 15$c$, the fourth XR side surface 15$d$, and the fourth YF side surface 15$f$ of the second base member 15. Moreover, the light source device 20 may be disposed on a lateral side of any one of the first substrate 11, the second substrate 12, and the first base member 14.

The number of integers corresponding to the index n of the incident light rays $J_n$ and the emission light rays $I_n$ and the tilt angle of each light ray are not limited to those described above. In this case, the values stored in the second table are determined based on the magnitudes of the tilt angle.

As the tilt angle increases, pixels P in the (k+1)-th row on which the emission light rays $I_n$ of the pixels P in the k-th row are incident, may be different from those in the above-described embodiment in some cases. For example, when the tilt angle is +45°, the emission light rays $I_n$ of the pixel Pt illustrated in FIG. 20 are incident only on the pixel P(k, i+1). When the tilt angle is larger than +45° and smaller than +90°, the emission light rays $I_n$ of the pixel Pt are incident on the pixels P(k, i+1) and P(k, i+2) and the amounts of the emission light rays $I_n$ of the pixel Pt are distributed to the pixels P(k, i+1) and P(k, i+2).

When the first drive circuit 30 calculates the sum of the amounts of the incident light rays $J_n$ for each selected pixel P at step S4, the amounts of the incident light rays $J_{-3}$, $J_{-2}$, $J_{-1}$, $J_0$, $J_{+1}$, $J_{+2}$, and $J_{+3}$ may be each multiplied by a weight coefficient. The weight coefficient varies depending on, for example, the size and structure of each pixel P, and is derived in advance by experiment or the like performed in advance and is stored in the storage of the first drive circuit 30.

The display panel 10 may be a transmissive liquid crystal panel. In this case, the light source device 20 is what is called a side-lighting backlight including the light source SL and a light guiding plate (not illustrated) and disposed on the back surface 10b side of the display panel 10. The light guiding plate has a plate surface facing the back surface 10b of the display panel 10. The light sources SL are disposed facing a side surface of the light guiding plate, which is parallel to the first side surface 10c of the display panel 10. Light of the light source SL is incident on the light guiding plate through the side surface of the light guiding plate and emitted from the side surface of the light guiding plate toward the back surface 10b of the display panel 10. Light of the light source SL is consumed in the light guiding plate, and the amount of light of the light source SL decreases from the side surface of the light guiding plate on which light of the light sources SL is incident toward a surface opposite the side surface. Thus, such a display device has a problem in that the luminance of a pixel P decreases from the first side surface 10c of the display panel 10 toward the second side surface 10d, similarly to the display device 1 of the above-described embodiment. Thus, the first drive circuit 30 calculates output gradation values as in the above-described embodiment to equalize luminance among a plurality of pixels P even in a case in which the display panel 10 is a transmissive liquid crystal panel and the light source device 20 is a backlight with the light sources SL disposed on a lateral side of the light guiding plate.

It should be understood that, among other effects achieved by aspects described in the present embodiment, those clear from the description of the present specification or those that could be thought of by the skilled person in the art as appropriate are achieved by the present disclosure.

What is claimed is:

1. A display device comprising:
   a display panel including a display region overlapping a plurality of pixels in a plan view and having a first side surface and a second side surface opposite to the first side surface, the plurality of pixels being arranged in a matrix of rows and columns;
   a light source device disposed on a side of the first side surface and configured to emit light that enters the display panel from the first side surface; and
   a drive circuit configured to calculate an output gradation value based on an input gradation value included in an image signal and to output a pixel drive signal corresponding to the output gradation value to a corresponding one pixel of the plurality of pixels, wherein
   the plurality of pixels include a first pixel and a second pixel that are arranged in a first direction from the first side surface toward the second side surface,
   the second pixel is disposed between the first pixel and the second side surface, and
   when the input gradation value corresponding to the first pixel is equal to the input gradation value corresponding to the second pixel, the drive circuit is configured to set the output gradation value corresponding to the second pixel to be larger than the output gradation value corresponding to the first pixel.

2. The display device according to claim 1, wherein
   light emitted from the light source device propagates in the display panel from the first side surface toward the second side surface, and
   the display panel includes a liquid crystal layer containing polymer-dispersed liquid crystal.

3. The display device according to claim 2, wherein
   light emitted from the light source device propagates in the display panel along the first direction and a second direction tilted relative to the first direction in a plan view, and
   the drive circuit calculates the output gradation value by using the input gradation value of the one pixel, an amount of light incident on the one pixel along the first direction, and an amount of light incident on the one pixel along the second direction.

4. The display device according to claim 3, wherein
   the light incident on the first pixel is scattered in the first pixel, and
   the drive circuit is configured to calculate an amount of the light incident on the second pixel based on a degree of scattering of the light incident on the first pixel.

5. The display device according to claim 4, wherein
   the first pixel includes a switching element, and
   the light incident on the first pixel bounces off the switching element and is scattered thereby.

6. The display device according to claim 3, wherein the drive circuit is configured to calculate an amount of light incident on the second pixel based on a degree of scattering of the light incident on the first pixel that changes with the output gradation value at the first pixel.

7. The display device according to claim 3, wherein
   the plurality of pixels are disposed in a matrix of rows and columns in the first direction and a third direction orthogonal to the first direction in a plan view,
   the plurality of pixels include a third pixel adjacent to the second pixel in the third direction, and
   the light incident on the first pixel is emitted from the first pixel and incident on the second pixel and the third pixel.

8. The display device according to claim 7, wherein an amount of light emitted from the first pixel is distributed as an amount of light incident on the second pixel and an amount of light incident on the third pixel in accordance with a tilt angle of the second direction relative to the first direction.

9. The display device according to claim 1, wherein
   the drive circuit is configured to
   adjust at least one of a first output gradation value calculated based on the input gradation value corresponding to the first pixel or a second output gradation value calculated based on the input gradation value corresponding to the second pixel, when the input gradation value corresponding to the first pixel is equal to the input gradation value corresponding to the second pixel, and
   adjust neither the first output gradation nor the second output gradation when the input gradation value corresponding to the first pixel is different from the input gradation value corresponding to the second pixel.

10. The display device according to claim 1, wherein
    the plurality of pixels include a plurality of fourth pixels arranged in the first direction, when the input gradation values of the respective fourth pixels are equal to one another and the light source device emits light having a first emission light amount, light having a first incident light amount is incident on a fourth pixel closest to the first side surface among the plurality of fourth pixels, when the input gradation values of the respective fourth pixels are equal to one another and the light source device emits light having a second emission light amount larger than the first emission light amount, light having a second incident light amount is incident on a fourth pixel closest to the second side surface among the plurality of fourth pixels, and the first incident light amount is equal to the second incident light amount.

11. A display device comprising:
a display panel including a first side surface;
a plurality of light sources facing the first side surface;
a first pixel disposed on the display panel;
a second pixel disposed on the display panel and opposite to the first side surface with the first pixel therebetween; and
a drive circuit configured to receive an image signal including a first input gradation value corresponding to the first pixel and a second input gradation value corresponding to the second pixel, wherein
the drive circuit is configured to
  output, to the first pixel, a first pixel drive signal including a first output gradation value corresponding to the first input gradation value and
  output, to the second pixel, a second pixel drive signal including a second output gradation value corresponding to the second input gradation value, and
when the first input gradation value is equal to the second input gradation value, the second output gradation value is larger than the first output gradation value.

12. The display device according to claim 11, wherein
the display panel further includes a second side surface facing the first side surface in a first direction, and
the first pixel and the second pixel are arranged in the first direction.

13. The display device according to claim 11, wherein
the display panel includes
  a liquid crystal layer containing polymer- dispersed liquid crystal,
  a first substrate and a second substrate with the liquid crystal layer therebetween, and
  a third substrate disposed opposite to the first substrate with the second substrate therebetween,
the third substrate includes the first side surface, and
light emitted from the plurality of light sources enters the third substrate from the first side surface and is emitted from a principal surface of the third substrate.

14. A display device comprising:
a display panel including a liquid crystal layer containing polymer-dispersed liquid crystal, a first substrate and a second substrate with the liquid crystal layer therebetween, and a third substrate, the second substrate being disposed between the first substrate and the third substrate;
a plurality of light sources facing a side surface of the third substrate;
a first pixel and a second pixel disposed on the display panel and arranged in a direction intersecting the side surface; and
a drive circuit configured to receive an image signal including a first input gradation value corresponding to the first pixel and a second input gradation value corresponding to the second pixel, wherein
light emitted from the plurality of light sources enters the third substrate from the side surface and is emitted from a principal surface of the third substrate,
the drive circuit is configured to
  output, to the first pixel, a first pixel drive signal including a first output gradation value corresponding to the first input gradation value and
  output, to the second pixel, a second pixel drive signal including a second output gradation value corresponding to the second input gradation value, and
when the first input gradation value is equal to the second input gradation value, the second output gradation value is larger than the first output gradation value.

* * * * *